(12) United States Patent
Higginbotham et al.

(10) Patent No.: US 9,501,070 B2
(45) Date of Patent: Nov. 22, 2016

(54) TEMPERATURE CONTROL METHOD AND APPARATUS

(75) Inventors: Steven N. Higginbotham, Eastern Heights (AU);
(Continued)

(73) Assignee: QIAGEN INSTRUMENTS AG, Hombrechtikon (CH)

(*) Notice: Subject to any disclaimer, the term of this patent is extended or adjusted under 35 U.S.C. 154(b) by 656 days.

(21) Appl. No.: 13/642,102

(22) PCT Filed: Apr. 19, 2011

(86) PCT No.: PCT/AU2011/000447
§ 371 (c)(1),
(2), (4) Date: Mar. 1, 2013

(87) PCT Pub. No.: WO2011/130785
PCT Pub. Date: Oct. 27, 2011

(65) Prior Publication Data
US 2013/0168074 A1    Jul. 4, 2013

(30) Foreign Application Priority Data

Apr. 20, 2010 (AU) ............... 2010901655

(51) Int. Cl.
*G01K 13/00* (2006.01)
*G01F 15/02* (2006.01)
(Continued)

(52) U.S. Cl.
CPC ............... *G05D 23/19* (2013.01); *B01L 7/52* (2013.01); *B01L 3/5082* (2013.01);
(Continued)

(58) Field of Classification Search
CPC .......... C12Q 1/68; G01K 17/04; G01K 13/00; G01K 11/08; G01F 15/02; G01N
(Continued)

(56) References Cited

U.S. PATENT DOCUMENTS 3,210,996 A * 10/1965 Harwood et al. ............... 374/31
4,088,447 A * 5/1978 Walker .......................... 436/147
(Continued)

FOREIGN PATENT DOCUMENTS

| JP | 56082436 A | * | 7/1981 |
| JP | 11028925 A | * | 2/1999 |
| WO | 2009067744 A1 | | 6/2009 |

OTHER PUBLICATIONS

International Preliminary Report on Patentability Based on Application No. PCT/AU2011/000447 Mailed Nov. 1, 2012.
(Continued)

*Primary Examiner* — Gail Kaplan Verbitsky
(74) *Attorney, Agent, or Firm* — McBee Moore Woodward Vanik IP, LLC

(57) ABSTRACT

A method of controlling the temperature of a liquid held within a reaction container in a chamber of a thermal cycling apparatus, the method including determining a sensed chamber temperature from a temperature sensor in the chamber, determining an air temperature using the sensed chamber temperature, determining a liquid temperature using the air temperature and selectively heating or cooling air in the chamber in accordance with the liquid temperature.

20 Claims, 11 Drawing Sheets

US 9,501,070 B2

Page 2

(75) Inventors: Warren Ludcke, Underwood (AU); Jason Austin, Stretton (AU)

(51) Int. Cl.
*G01N 25/00* (2006.01)
*G05D 23/19* (2006.01)
*B01L 7/00* (2006.01)
*B01L 3/00* (2006.01)

(52) U.S. Cl.
CPC ..... *B01L 2200/147* (2013.01); *B01L 2300/185* (2013.01); *B01L 2300/1844* (2013.01)

(58) Field of Classification Search
CPC .................... 25/00;G01N 25/20; G01N 25/44; F28D 1/00; F25B 13/00
USPC ............. 374/10–12, 29–39, 4, 5, 1, 2, 3, 45, 374/141, 161, 147; 702/50, 45; 73/1.02, 73/291, 295; 422/105, 108, 51; 165/58, 165/61, 75
See application file for complete search history.

(56) References Cited

U.S. PATENT DOCUMENTS

| | | | | |
|---|---|---|---|---|
| 4,306,452 A * | 12/1981 | Ludwig | | 374/38 |
| 4,351,805 A * | 9/1982 | Reisman et al. | | 422/202 |
| 4,683,195 A | 7/1987 | Mullis et al. | | |
| 4,683,202 A | 7/1987 | Mullis | | |
| 4,800,159 A | 1/1989 | Mullis et al. | | |
| 4,846,584 A * | 7/1989 | Burch | B01J 19/0013 | 374/31 |
| 4,859,077 A * | 8/1989 | Ito et al. | | 374/33 |
| 4,889,818 A | 12/1989 | Gelfand et al. | | |
| 4,923,306 A * | 5/1990 | Fauske | | 374/34 |
| 4,963,499 A * | 10/1990 | Stockton et al. | | 436/147 |
| 4,965,188 A | 10/1990 | Mullis et al. | | |
| 4,988,617 A | 1/1991 | Landegren et al. | | |
| 5,023,171 A | 6/1991 | Ho et al. | | |
| 5,066,584 A | 11/1991 | Gyllensten et al. | | |
| 5,067,094 A * | 11/1991 | Hayes | | 702/51 |
| 5,075,216 A | 12/1991 | Innis et al. | | |
| 5,079,352 A | 1/1992 | Gelfand et al. | | |
| 5,091,310 A | 2/1992 | Innis | | |
| 5,104,792 A | 4/1992 | Silver et al. | | |
| 5,269,370 A * | 12/1993 | Christian | C21D 1/785 | 165/61 |
| 5,290,101 A * | 3/1994 | Englert | B01L 7/52 | 165/108 |
| 5,438,846 A * | 8/1995 | Datta | F25B 13/00 | 62/238.7 |
| 5,475,610 A * | 12/1995 | Atwood | G05D 23/1935 | 422/943 |
| 5,547,282 A * | 8/1996 | Pinhack et al. | | 374/36 |
| 5,624,187 A * | 4/1997 | Reading | | 374/11 |
| 5,876,118 A * | 3/1999 | Vogel | | 374/11 |
| 6,074,868 A | 6/2000 | Blumenfeld | | |
| 6,627,451 B2 * | 9/2003 | Pinhack et al. | | 436/147 |
| 7,048,435 B2 * | 5/2006 | Shdaimah et al. | | 374/14 |
| 7,081,226 B1 | 7/2006 | Wittwer et al. | | |
| 7,287,903 B2 * | 10/2007 | Estes | G01N 3/60 | 324/750.08 |
| 7,476,020 B2 * | 1/2009 | Zufferey et al. | | 374/134 |
| 7,645,070 B2 | 1/2010 | Atwood et al. | | |
| 7,905,855 B2 * | 3/2011 | Childers | | 604/29 |
| 9,034,572 B2 * | 5/2015 | Loebbert | C12M 23/28 | 435/287.1 |
| 2002/0021739 A1 * | 2/2002 | Fraden | | 374/2 |
| 2002/0115200 A1 | 8/2002 | Zou et al. | | |
| 2004/0086927 A1 | 5/2004 | Atwood et al. | | |
| 2006/0154270 A1 * | 7/2006 | Tajima | B01L 3/021 | 435/6.14 |
| 2007/0195853 A1 * | 8/2007 | Park | C23C 16/46 | 374/1 |
| 2008/0025365 A1 * | 1/2008 | Kawaguchi et al. | | 374/31 |
| 2008/0032347 A1 * | 2/2008 | Sarofim | B01L 7/52 | 435/91.2 |
| 2008/0212643 A1 * | 9/2008 | McGahhey | G01K 1/026 | 374/152 |
| 2008/0275229 A1 * | 11/2008 | Lem | C12Q 1/6848 | 536/25.42 |
| 2009/0155765 A1 * | 6/2009 | Atwood | B01L 3/50851 | 435/3 |
| 2009/0226903 A1 * | 9/2009 | Cobb | B01L 3/50851 | 435/6.11 |
| 2009/0269835 A1 * | 10/2009 | Ceremony | B01L 7/52 | 435/286.2 |
| 2010/0075296 A1 | 3/2010 | Cloake et al. | | |
| 2010/0323923 A1 | 12/2010 | Corbett | | |
| 2011/0035165 A1 * | 2/2011 | Koyama | G05B 23/0221 | 702/45 |
| 2012/0015365 A1 * | 1/2012 | Bodin | B01L 7/52 | 435/6.12 |
| 2014/0254622 A1 * | 9/2014 | Leber | G01K 11/20 | 374/1 |
| 2015/0253201 A1 * | 9/2015 | Dinges | B01L 3/50825 | 435/6.12 |
| 2015/0303860 A1 * | 10/2015 | Imanishi | H02K 21/14 | 318/473 |
| 2015/0337400 A1 * | 11/2015 | Wilson | B01L 3/5085 | 700/299 |
| 2016/0121325 A1 * | 5/2016 | Masquelier | B01L 3/50273 | 506/2 |

OTHER PUBLICATIONS

Written Opinion Based on Application No. PCT/AU2011/000447 Mailed Jun. 2, 2011.
International Search Report for PCT/AU2011/000447 Mailed Jun. 2, 2011.

* cited by examiner

TEMPERATURE CONTROL METHOD AND APPARATUS

CROSS REFERENCE TO RELATED APPLICATIONS

This application is a §371 National Stage Application of PCT/AU2011/000447, filed Apr. 19, 2011, which claims priority to Australian Patent Application No. 2010901655, filed Apr. 20, 2010.

BACKGROUND OF THE INVENTION

1. Field of the Invention

The present invention relates to a method and apparatus for controlling the temperature of a liquid and in particular to a method and apparatus for controlling the temperature of a liquid in a thermal cycling apparatus. The present invention also relates to a method and apparatus for determining the temperature of a liquid in a thermal cycling apparatus.

2. Description of Related Art

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

PCR (Polymerase Chain Reaction) is a technique involving multiple cycles that results in the exponential amplification of certain polynucleotide sequences each time a cycle is completed. The technique of PCR is well known and is described in many books, including, PCR: A Practical Approach M. J. McPherson, et al., IRL Press (1991), PCR Protocols: A Guide to Methods and Applications by Innis, et al., Academic Press (1990), and PCR Technology: Principals and Applications for DNA Amplification H. A. Erlich, Stockton Press (1989). PCR is also described in many U.S. patents, including U.S. Pat. Nos. 4,683,195; 4,683,202; 4,800,159; 4,965,188; 4,889,818; 5,075,216; 5,079,352; 5,104,792; 5,023,171; 5,091,310; and 5,066,584.

The PCR technique typically involves the step of denaturing a polynucleotide, followed by the step of annealing at least a pair of primer oligonucleotides to the denatured polynucleotide, i.e., hybridizing the primer to the denatured polynucleotide template. After the annealing step, an enzyme with polymerase activity catalyzes synthesis of a new polynucleotide strand that incorporates the primer oligonucleotide and uses the original denatured polynucleotide as a synthesis template. This series of steps (denaturation, primer annealing, and primer extension) constitutes a PCR cycle.

As cycles are repeated, the amount of newly synthesized polynucleotide increases exponentially because the newly synthesized polynucleotides from an earlier cycle can serve as templates for synthesis in subsequent cycles. Primer oligonucleotides are typically selected in pairs that can anneal to opposite strands of a given double-stranded polynucleotide sequence so that the region between the two annealing sites is amplified.

Denaturation of DNA typically takes place at around 90 to 95° C., annealing a primer to the denatured DNA is typically performed at around 40 to 60° C., and the step of extending the annealed primers with a polymerase is typically performed at around 70 to 75° C. Therefore, during a PCR cycle the temperature of the reaction mixture must be varied, and varied many times during a multicycle PCR experiment.

The PCR technique has a wide variety of biological applications, including for example, DNA sequence analysis, probe generation, cloning of nucleic acid sequences, site-directed mutagenesis, detection of genetic mutations, diagnoses of viral infections, molecular "fingerprinting" and the monitoring of contaminating microorganisms in biological fluids and other sources.

In addition to PCR, other in vitro amplification procedures, including ligase chain reaction as disclosed in U.S. Pat. No. 4,988,617 to Landegren and Hood, are known and advantageously used in the prior art. More generally, several important methods known in the biotechnology arts, such as nucleic acid hybridization and sequencing, are dependent upon changing the temperature of solutions containing sample molecules in a controlled fashion. Conventional techniques rely on use of individual wells or tubes cycled through different temperature zones. For example, a number of thermal "cyclers" used for DNA amplification and sequencing are disclosed in the prior art in which a temperature controlled element or "block" holds a reaction mixture, and wherein the temperature of the block is varied over time. One advantage of these devices is that a relatively large number of samples can be processed simultaneously, e.g. 96 well plates are commonly employed.

U.S. Pat. No. 7,645,070 describes an instrument for performing highly accurate PCR employing an assembly, a heated cover, and an internal computer, is provided. The assembly is made up of a sample block, a number of Peltier thermal electric devices, and a heat sink, clamped together. A control algorithm manipulates the current supplied to thermoelectric coolers such that the dynamic thermal performance of a block can be controlled so that pre-defined thermal profiles of sample temperature can be executed. The sample temperature is calculated instead of measured using a design specific model and equations. The control software includes calibration diagnostics which permit variation in the performance of thermoelectric coolers from instrument to instrument to be compensated for such that all instruments perform identically. The block/heat sink assembly can be changed to another of the same or different design. The assembly carries the necessary information required to characterize its own performance in an on-board memory device, allowing the assembly to be interchangeable among instruments while retaining its precision operating characteristics.

U.S. Pat. No. 5,475,610 describes an instrument for performing highly accurate PCR employing a sample block in microtiter tray format. The sample block has local balance and local symmetry. A three zone film heater controlled by a computer and ramp cooling solenoid valves also controlled by the computer for gating coolant flow through the block controls the block temperature. Constant bias cooling is used for small changes. Sample temperature is calculated instead of measured. A platen deforms plastic caps to apply a minimum acceptable threshold force for seating the tubes and thermally isolates them. A cover isolates the block. The control software includes diagnostics. An install program tests and characterizes the instrument. A new user interface is used. Disposable, multipiece plastic microtiter trays to give individual freedom to sample tubes are taught.

However, such block devices suffer various drawbacks, in that they are relatively slow in cycling the reaction mixtures, they are relatively energy intensive to operate, temperature control is less than ideal and detection of the reaction mixture in situ is difficult.

In an effort to avoid several of these disadvantages, other thermal cyclers have been developed in which a plurality of containers for holding reaction mixture(s) are supported on a rotatable carousel rotatably mounted within a chamber adapted to be heated and cooled. For example, see U.S. Pat. No. 7,081,226 to Wittwer et al. However, these devices still suffer various disadvantages. For example, control over the temperature of the reaction mixtures is less than ideal, control over the rate of heating and cooling of the reaction mixtures is less than ideal, and these devices have relatively poor energy efficiency.

Thus, there still remains a need for thermocyclers for PCR which provide improved temperature control of the reaction mixtures, are not complex to use, can provide real-time analysis of the reaction occurring in the sample containers, and are energy efficient.

SUMMARY

The present invention seeks to overcome or ameliorate at least one of the disadvantages of the abovementioned prior art, or to provide a useful alternative.

In a first broad form the present invention seeks to provide a method of controlling the temperature of a liquid held within a reaction container in a chamber of a thermal cycling apparatus, the method including:
 a) determining a sensed chamber temperature from a temperature sensor in the chamber;
 b) determining an air temperature using the sensed chamber temperature;
 c) determining a liquid temperature using the air temperature; and,
 d) selectively heating or cooling air in the chamber in accordance with the liquid temperature.

Typically the method includes:
 a) determining a sensed ambient temperature from a temperature sensor outside the chamber; and,
 b) determining the air temperature at least in part using the sensed ambient temperature and the sensed chamber temperature.

Typically the method includes determining the air temperature using an air thermal model.

Typically the method includes:
 a) determining if the chamber is closed; and,
 b) at least one of:
  i) if the chamber is closed, determining the effective air temperature using the sensed chamber temperature and a closed chamber model; and,
  ii) if the chamber is open, determining the effective air temperature using the sensed chamber temperature, a sensed ambient temperature and an open chamber model.

Typically the method includes, for the closed chamber model:
 a) comparing the sensed chamber temperature to a threshold temperature; and,
 b) at least one of:
  i) if the sensed chamber temperature is below the threshold temperature, determining the air temperature using a first closed chamber model; and,
  ii) if the sensed chamber temperature is above the threshold temperature, determining the air temperature using a second closed chamber model.

Typically the air temperature is determined at least in part using the relationship:

$$T_{SS} = \begin{cases} k_{SL}T_S + c_L, & \text{if } T_S < T_T \\ k_{SU}T_S + c_U, & \text{if } T_S \geq T_T \end{cases}$$

where:
 $T_{SS}$ is a closed chamber model air temperature;
 $T_S$ is the sensed chamber temperature;
 $T_T$ is a threshold temperature;
 $k_{SL}$ is a first closed chamber model coefficient;
 $k_{SU}$ is a second closed chamber model coefficient;
 $c_L$ is a first closed chamber model offset value;
 $c_U$ is a second closed chamber model offset value.

Typically for the open chamber model, the method includes, determining the air temperature at least in part using the relationship:

$$T_{OC} = k_{SS}T_{SS} + k_{AM}T_{AM} + c_{OC}$$

where:
 $T_{OC}$ is an open chamber model air temperature;
 $T_{SS}$ is a closed chamber model air temperature;
 $T_{AM}$ is a sensed ambient temperature;
 $k_{SS}$ is a first open chamber model coefficient;
 $k_{AM}$ is a second open chamber model coefficient;
 $c_{OC}$ is an open chamber model offset value.

Typically the method includes determining the air temperature at least in part using the relationship:

$$T_{\mathit{Eff}} = \begin{cases} T_{SS}, & \text{if the chamber is closed} \\ T_{OC}, & \text{if the chamber is open} \end{cases}$$

where:
 $T_{\mathit{Eff}}$ is the air temperature

Typically the method includes determining the liquid temperature using the air temperature and a liquid thermal model.

Typically the method includes determining the liquid temperature using a previously determined liquid temperature.

Typically the method includes determining the liquid temperature at least in part using the relationship:

$$T_L = (1-k_E-k_L)T_L(n-1)+k_L T_L(n-2)+k_E T_{\mathit{Eff}}(n)$$

where:
 n is a discrete time interval;
 $T_L(n)$ is the liquid temperature at time n;
 $T_{\mathit{Eff}}(n)$ is the air temperature at time n;
 $k_E$ is a first liquid model coefficient;
 $k_L$ is a second liquid model coefficient.

Typically the method includes:
 a) determining a target liquid temperature;
 b) determining a target air temperature in accordance with the target liquid temperature; and,
 c) selectively heating or cooling air in the chamber in accordance with the target air temperature.

Typically the method includes, determining the target air temperature at least in part using the liquid temperature.

Typically the method includes:
 a) determining a change in target liquid temperature;
 b) comparing the change to a threshold; and,
 c) at least one of:
  i) if the change is less than the threshold, determining the target air temperature to be the target liquid temperature; and,
  ii) if the change is more than the threshold, determining the target air temperature in accordance with the target liquid temperature and the liquid temperature.

Typically if the change is more than the threshold the method includes determining the air target temperature using the relationship:

$$T_{AS}(n)=T_{LS}+k_{OF}(T_{LS}-T_{LM}(n))$$

where:
- $T_{AS}(n)$ is the air target temperature at any given discrete time n;
- $T_{LS}$ is the target liquid temperature;
- $k_{OF}$ is an overshoot factor constant;
- $T_{LM}(n)$ is a liquid temperature at any given discrete time n.

Typically the method includes determining at least one constant from reference constant values.

Typically the method includes determining reference constant values from a data store.

Typically the at least one constant includes at least one of:
- a first closed chamber model coefficient $k_{SL}$;
- a second closed chamber model coefficient $k_{SU}$;
- a first closed chamber model offset value $c_L$;
- a second closed chamber model offset value $c_U$;
- a first open chamber model coefficient $k_{SS}$;
- a second open chamber model coefficient $k_{AM}$;
- an open chamber model offset value $c_{OC}$;
- a first liquid model coefficient $k_E$;
- a second liquid model coefficient $k_L$;
- an overshoot factor constant $k_{OF}$.

Typically the method includes determining at reference constant values during a calibration procedure.

Typically the method includes, determining closed chamber model constants by:
a) gradually increasing a chamber temperature with the chamber closed;
b) detecting a change in each of at least three markers provided in the chamber, each of the at least three markers being adapted to undergo a detectable change at a respective marker temperature;
c) determining a sensed chamber temperature for each marker change; and,
d) determining closed chamber model constants using the sensed chamber temperature and a corresponding marker temperature.

Typically the method includes, determining liquid model constants for a given liquid volume by:
a) performing a number of thermal cycling runs;
b) for each run:
  i) monitoring a characteristic of a liquid sample provided in the chamber when the chamber is closed, the sample characteristic being indicative of a liquid temperature of the liquid sample;
  ii) determining at least one liquid temperature using the characteristic;
  iii) determining at least one sensed chamber temperature corresponding to the at least one liquid temperature;
  iv) determining an air temperature using the at least one sensed chamber temperature and a closed thermal model; and,
c) performing a regression analysis to relate the air temperature to the liquid temperature to thereby determine the liquid model constants.

Typically the method includes:
a) determining liquid model constants for a number of given liquid volumes; and,
b) interpolating liquid model constants for intermediate liquid volumes.

Typically the method includes, determining open chamber model constants by:
a) changing a chamber temperature with the chamber open;
b) monitoring a characteristic of a liquid sample provided in the chamber, the sample characteristic being indicative of a liquid temperature of the liquid sample;
c) determining a number of liquid temperatures using the characteristic;
d) determining a number of sensed chamber temperatures and sensed ambient temperatures corresponding to the number of liquid temperatures;
e) determining a number of air temperatures using the number of sensed chamber temperatures and a closed thermal model; and,
f) determining a number of air temperatures using the number of liquid temperatures and a liquid thermal model; and,
g) determining open chamber model constants using the air temperatures and the sensed chamber and sensed ambient temperatures.

Typically the method is performed at least in part using a controller of a thermal cycling apparatus, the controller including a processor and a memory.

Typically the method includes, in the processor, retrieving at least one constant from the memory.

Typically the method includes, in the processor:
a) receiving a sensed chamber temperature from a temperature sensor in the chamber;
b) determining an air temperature using the sensed chamber temperature and an air thermal model stored in the memory;
c) determining a liquid temperature using the air temperature and a liquid thermal model stored in the memory; and,
d) controlling at least one of a heater, a fan and a vent flap to thereby selectively heat or cool air in the chamber in accordance with the liquid temperature.

In a second broad form the present invention seeks to provide apparatus for controlling the temperature of a liquid held within a reaction container in a chamber of a thermal cycling apparatus, the apparatus including a controller that:
a) determines a sensed chamber temperature from a temperature sensor in the chamber;
b) determines an air temperature using the sensed chamber temperature;
c) determines a liquid temperature using the air temperature; and,
d) selectively heats or cools air in the chamber in accordance with the liquid temperature.

Typically controller includes a processor and a memory.

Typically the memory is for storing at least one of:
a) a liquid thermal model;
b) an air thermal model;
c) a closed chamber thermal model;
d) an open chamber thermal model; and,
e) at least one model constant.

Typically the processor:
a) receives a sensed chamber temperature from a temperature sensor in the chamber;
b) determines an air temperature using the sensed chamber temperature and an air thermal model stored in the memory;
c) determines a liquid temperature using the air temperature and a liquid thermal model stored in the memory; and, d) controls at least one of a heater, a fan and a vent flap to thereby selectively heat or cool air in the chamber in accordance with the liquid temperature.

Typically the controller is coupled to at least one of:
a) a chamber temperature sensor for sensing a chamber temperature;
b) an ambient temperature sensor for sensing an ambient temperature;
c) a heater for heating the chamber;
d) a fan for cycling ambient air through the chamber; and,
e) a vent flap for closing the chamber.

In a third broad form the present invention seeks to provide a method of determining the temperature of a liquid held within a reaction container in a chamber of a thermal cycling apparatus, the method including:
a) determining a sensed chamber temperature from a temperature sensor in the chamber;
b) determining an air temperature using the sensed chamber temperature; and,
c) determining a liquid temperature using the air temperature.

Typically the method includes determining the liquid temperature using the air temperature and a liquid thermal model.

Typically the method includes determining an air temperature using the sensed chamber temperature and an air thermal model.

Typically the method includes:
a) if the chamber is closed, determining the effective air temperature using the sensed chamber temperature and a closed chamber model; and,
b) if the chamber is open, determining the effective air temperature using the sensed chamber temperature, a sensed ambient temperature and an open chamber model.

In a fourth broad form the present invention seeks to provide apparatus for determining the temperature of a liquid held within a reaction container in a chamber of a thermal cycling apparatus, the apparatus including a processor that:
a) determines a sensed chamber temperature from a temperature sensor in the chamber;
b) determines an air temperature using the sensed chamber temperature; and,
c) determines a liquid temperature using the air temperature.

It will be appreciated that the broad forms of the invention may be used individually or in combination, and may be used for temperature control in a range of different applications, including, but not limited to nucleic acid amplification.

BRIEF DESCRIPTION OF THE DRAWINGS

Examples of the invention will now be described with reference to the accompanying drawings in which.

DETAILED DESCRIPTION OF A PREFERRED EMBODIMENT

Figure 1:
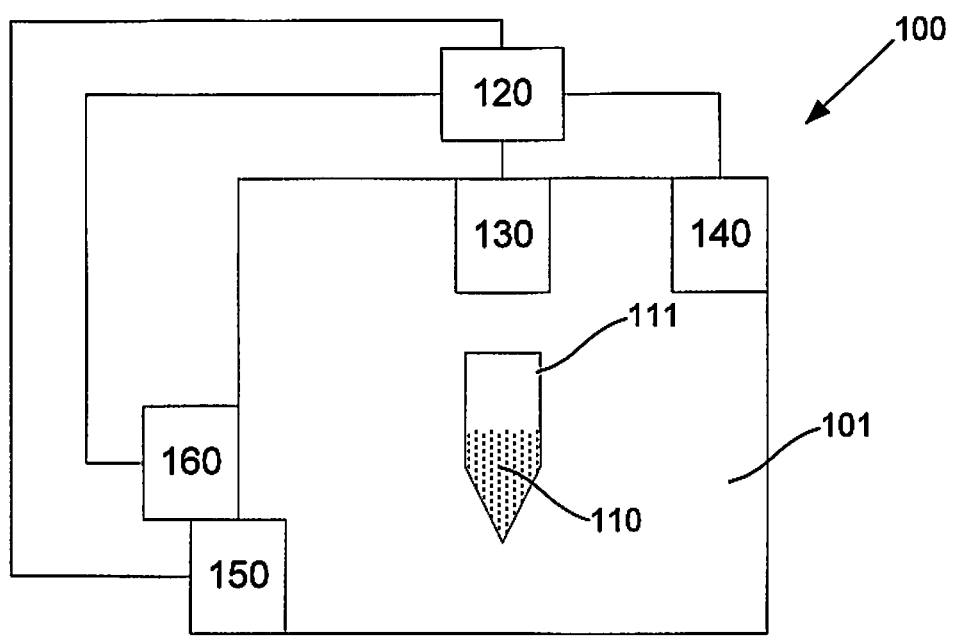
FIG. 1 is a schematic diagram of an example of apparatus for controlling the temperature of a reaction mixture.

An example apparatus for detecting and optionally controlling the temperature of a liquid, for example during a thermal cycling process, will now be described with reference to FIG. 1.

In this example, the apparatus 100 includes a chamber 101 containing a reaction container 111 having a liquid 110, such as a reaction mixture, therein. The apparatus 100 typically includes a controller 120 coupled to a heater 130 and temperature sensor 140. The heater 130 is typically a convection heater, or similar, arranged to heat air in the chamber 101, with the temperature sensor 140 being used for sensing a chamber temperature.

The apparatus 100 may optionally include a fan 150 and an ambient temperature sensor 160, coupled to the controller 120. The fan 150 can be used to allow ambient air to be supplied to the chamber 101, to thereby help cool the chamber 101, with the temperature of the ambient air being determined using the ambient temperature sensor 160. However, this is not essential, and other cooling mechanisms may be used, as will be described in more detail below.

It will be appreciated that in one example, multiple reaction containers may be provided in an array within the chamber, allowing the temperature of liquid in multiple reaction containers to be determined and optionally subsequently controlled, substantially simultaneously.

In use, the controller 120 is adapted to monitor signals from the temperature sensor 140, and use these to control the heater 130. Accordingly, the controller 120 can be any suitable form of controller, such as a suitably programmed processing system, FPGA (Field Programmable Gate Array), or the like.

Figure 2:
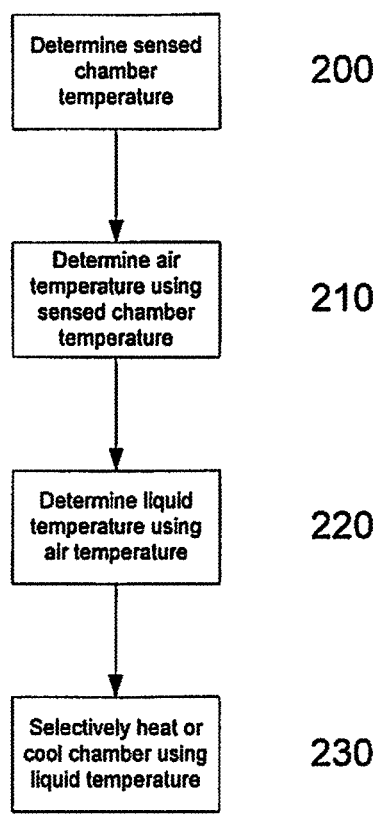
FIG. 2 is a flow chart of an example of a process for controlling the temperature of a reaction mixture using the apparatus of FIG. 1.

An example process for controlling the temperature of the liquid 120 will now be described with reference to FIG. 2.

In this example, at step 200 the controller 120 determines a sensed chamber temperature from the temperature sensor 140. At step 210, the controller 120 determines an air temperature using the sensed chamber temperature. The air temperature is typically determined from the sensed chamber temperature using an air thermal model, which defines one or more relationships between the sensed chamber temperature and the air temperature. In some examples, the air thermal model may also take into account a sensed ambient temperature determined from the ambient temperature sensor 160.

At step 220, the controller 120 determines a liquid temperature using the air temperature. The liquid temperature is typically determined from the air temperature using a liquid thermal model, which defines one or more relationships between the air temperature and the liquid temperature.

At step 230, the controller 120 optionally selectively heats or cools air in the chamber in accordance with the liquid temperature, for example by selectively controlling the heater 130, and/or the fan 150.

Accordingly, the above described process operates by calculating the air temperature to which the reaction container(s) are exposed, based on a chamber temperature sensed by a temperature sensor in the chamber. Once the air temperature has been calculated, this is used to determine the liquid temperature, allowing the liquid temperature to be accurately determined without requiring direct measurement of the liquid temperature. This has a number of benefits.

For example, accurate determination of the liquid temperature allows for improved thermal control of the liquid. This in turn allows faster heating and cooling to be performed, thereby reducing thermal cycling times. Additionally, the degree of heating and cooling used to achieve the required liquid temperature control can be reduced, making the thermal control process more energy efficient, and thereby reducing operating costs. The use of an indirect liquid temperature measurement is also particularly beneficial in rotary thermal cycling devices, where a number of reaction containers are mounted in a rotating carousel, and in which direct measurement of liquid temperature is problematic.

Accordingly, the above described process allows for accurate thermal control of liquid samples in a rotary thermal cycling apparatus, which cannot otherwise be easily achieved.

Further features will now be described with reference to the following examples.

Figure 3:
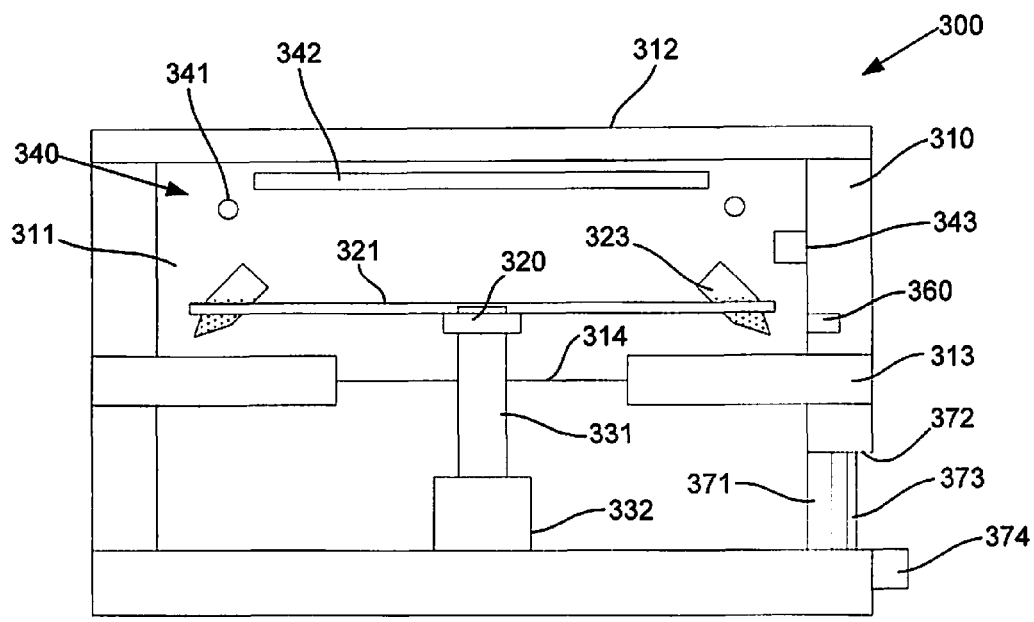
FIG. 3 is a schematic side view of a second example of apparatus for controlling the temperature of a reaction mixture.

An example of apparatus for controlling the temperature of a reaction process will now be described with reference to FIG. 3.

In this example, the apparatus 300 includes a body 310 and a lid 312, defining a chamber 311. The chamber 311 includes a mounting 320, for receiving a carousel 321. The carousel 321 includes a number of apertures 322 for receiving reaction containers 323, such as Eppendorf tubes or the like, containing a liquid sample, such as a reaction mixture.

The mounting 320 is coupled to shaft 331, which is in turn coupled to a drive motor 332, allowing the carousel 321 to be rotated within the chamber 311. A wall 313 is provided that extends across the chamber 311 to separate the drive motor 332 from the carousel 321. The wall 313 typically includes an aperture having a mesh 314 therein for allowing air flow through the mesh 314.

The chamber 311 includes a heater 340, which in this example includes a heating element 341 and a fan 342 for circulating air within the chamber 311. A chamber temperature sensor 343, such as a thermistor, is typically provided in the chamber 311 for generating signals indicative of a chamber temperature.

In one example, an optical sensor 360 is also provided mounted to the wall 313, to sense the status of a reaction based on the colour of an indicator in the reaction mixture. The optical sensor 360 can include an illumination source, such as a laser, and a corresponding optical detector for detecting reflected illumination.

The chamber 311 also typically includes a fan 371 provided in a vent 372, to allow ambient air from outside the chamber 311 to be circulated through the chamber 311. The vent typically includes a vent flap 373 for closing the vent 372. In one example, an ambient temperature sensor 374 is provided outside of the chamber 311, for generating signals indicative of a sensed ambient temperature.

Figure 4:
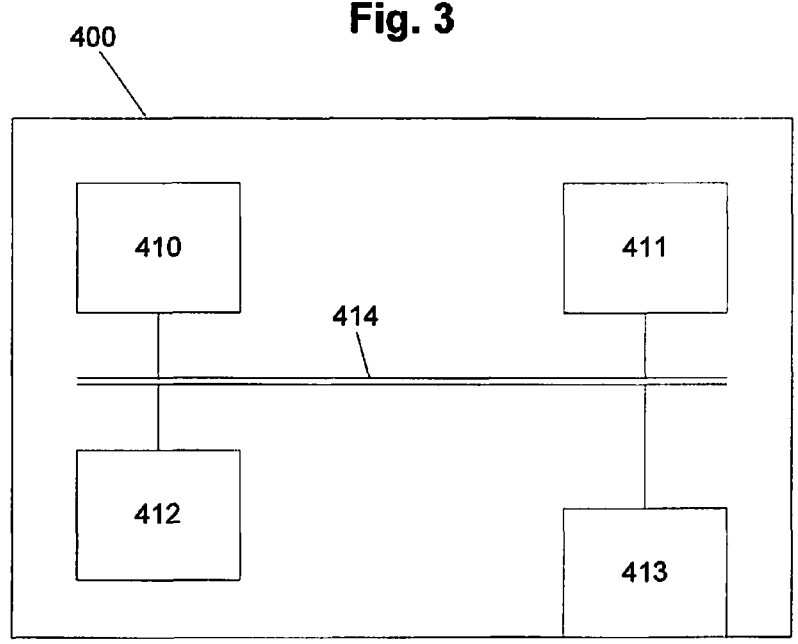
FIG. 4 is a schematic diagram of an example of a controller for the apparatus of FIG. 3.

It will be appreciated that the apparatus will also typically include a controller, an example of which will now be described with reference to FIG. 4.

In this example, the controller 400 includes a processor 410, a memory 411, an input/output device 412 such as a keypad and display, and an interface 413 coupled together via a bus 414. The interface 413 may be provided to allow the controller 400 to be coupled to any one or more of the heater 340, the drive 332, the temperature sensors 343, 374, the fan 371 and the vent flap 373. The interface may also include an external interface used to provide connection to external peripheral devices, such as a bar code scanner, computer system, or the like. Accordingly, it will be appreciated that the controller 400 may be formed from any suitable processing system, FPGA, or the like.

In use, the processor 410 typically executes instructions stored in the memory 411, to allow the apparatus 300 to be controlled. In this regard, a user will typically select a desired thermal cycling process, including a required temperature profile, using the input/output device 412. This allows the processor 410 to access the instructions and control the apparatus 300 to thereby cause the apparatus 300 to implement the selected thermal cycling process.

In particular, this causes the processor 410 to monitor signals from the temperature sensors 343, 374, and uses these to determine a liquid temperature. Determination of the liquid temperature typically involves having the processor 410 access air and liquid thermal models, together with associated reference constant values, from the memory 411. In one example, the models are as outlined below, with the reference constants being derived during a calibration and/or configuration process, as will also be described in more detail below. The processor 410 then uses the liquid temperature to control operation of the heater 340, the fan 371 and the vent flap 373, thereby allowing the required temperature profile to be implemented.

It will be appreciated that the processor 410 may also determine a reaction status, for example using signals determined from the optical sensor 350, and perform additional control, such as control of the drive 332, to thereby perform the thermal cycling process. As such functions are known in the art, this will not be described in any further detail.

It will be appreciated from the above that the apparatus is particularly directed to thermocyclers for nucleic acid amplification, wherein the reaction containers are supported on a rotatable circular carousel rotatably mounted within a chamber. Particularly preferred thermocyclers for use with the apparatus are the Rotor-Gene™ family of thermocyclers manufactured and distributed by Qiagen GMBH (www.qiagen.com). Other similar devices are disclosed in International PCT Publication No.'s WO 92/20778 and WO 98/49340. However, it will be appreciated that other commercially available thermocyclers may be modified to operate as described above.

An example of the operation of the apparatus of FIG. 3 to control the temperature of liquid in the reaction container will now be described with reference to FIG. 5.

In this example, at step 500, the controller 400 determines a change in target liquid temperature $\Delta T_{LS}$, based on a target liquid temperature $T_{LS}(n)$ for the thermal cycling process. This information is typically determined from a temperature profile stored in the memory 411, which is associated with the current thermal cycling process. At step 510, the controller 400 compares a change in target liquid temperature $\Delta T_{LS}$ to a threshold value $\Delta T_{OSTH}$. This is used to allow the apparatus to operate in one of two modes, generally referred to as holding and overshoot modes.

In this instance, if the magnitude of the change in target liquid temperature $\Delta T_{LS}$ is less than the threshold value $\Delta T_{OSTH}$, then the controller 400 operates in holding mode. Accordingly, the controller 400 sets a target air temperature $T_{AS}(n)$ to the target liquid temperature $T_{LS}(n)$ at step 520, and then selectively heats or cools the chamber 311, using the heater 340 and/or fan 371 and vent flap 373, based on the target air temperature $T_{AS}(n)$, at step 530. Consequently, in the holding mode, it is assumed that changes in air temperature are small enough that the liquid temperature remains substantially in equilibrium with the air temperature.

However, if the magnitude of the change in target liquid temperature $\Delta T_{LS}$ is greater than the threshold value $\Delta T_{OSTH}$, then the controller 400 operates in overshoot mode. In overshoot mode, at step 540 the controller 400 determines a liquid temperature $T_{LM}(n)$ using a liquid thermal model, which will be described in more detail below. At step 550, the controller 400 then determines a target air temperature $T_{AS}(n)$ using the liquid temperature $T_{AS}(n)$, which in one example is achieved using the following relationship:

$$T_{AS}(n) = T_{LS} + k_{OF}(T_{LS} - T_{LM}(n)) \quad (1)$$

where:
$T_{AS}(n)$ is the air target temperature at any given discrete time n;
$T_{LS}$ is the target liquid temperature;
$k_{OF}$ is an overshoot factor constant;
$T_{LM}(n)$ is a liquid temperature at any given discrete time n.

Figure 6:
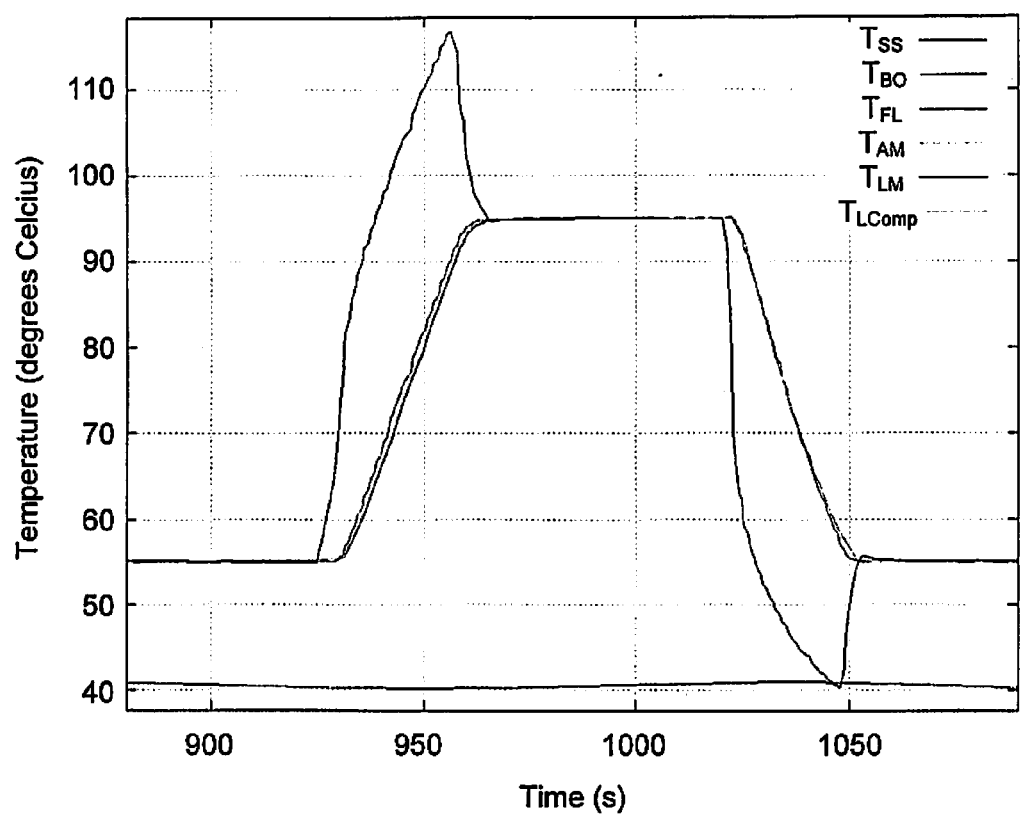
FIG. 6 is a graph showing an example of the temperature response of the apparatus of FIG. 3 operating using the control process of FIG. 5.

In this instance, the air temperature is varying rapidly, so that the air temperature in the chamber 311 differs significantly to the liquid temperature. This allows the liquid to be heated or cooled as rapidly as possible, taking into account the thermal mass of the liquid and the reaction container. As the liquid temperature nears the target temperature, the heating or cooling effect is reduced, so that the liquid temperature just reaches the target temperature. An example temperature profile is shown in FIG. 6.

The result of this arrangement is that when in overshoot mode:
For the first 90% of the transition, the heating or cooling power is maximal, to maximise the speed of the transition;
In the final 10% part of the liquid temperature transition, the liquid heating/cooling rate is reduced in proportion to how close it is to the target temperature, as there is a gradual reduction in the difference between the air set temperature and the liquid target temperature, instead of an abrupt change.

Accordingly, in this arrangement, the liquid temperature gradually approaches the target temperature, such that it does not excessively overshoot or undershoot the target temperature, whilst allowing the rate of heating/cooling to be maximised, thereby reducing the thermal cycle time. It should also be noted that when heating from 55° C. to 95° C., the cooling vent flap 373 is not opened. This is in contrast to some traditional control processes, the cooling vent flap 373 is opened at the end of the transition to abruptly cool the air, thereby resulting in greater overall energy usage for the apparatus. It will therefore be appreciated that this provides a particularly beneficial thermal control process.

In order to operate in accordance with the above described thermal control process, a liquid temperature is determined, and an example of the process for achieving this will now be described with reference to FIG. 7.

In this example, at step 700, the controller 400 determines a sensed chamber temperature $T_S$ from the chamber temperature sensor 343. As the chamber temperature sensor 343 will detect a localised air temperature within the chamber 311, it is necessary to use an air thermal model to derive an air temperature that is more accurately reflective of the effective air temperature within the chamber 311. In this sense, the air temperature is therefore the effective air temperature to which the reaction containers are exposed. The air temperature is given by:

$$T_{Eff} = \begin{cases} T_{SS}, & \text{if the chamber is closed} \\ T_{OC}, & \text{if the chamber is open} \end{cases} \quad (2)$$

where:
$T_{Eff}$ is the air temperature
$T_{SS}$ is a closed chamber model air temperature;
$T_{OC}$ is an open chamber model air temperature;

Accordingly, in this example, the air temperature is calculated using an air thermal model that is divided into a closed chamber model and an open chamber model.

Figure 8A:
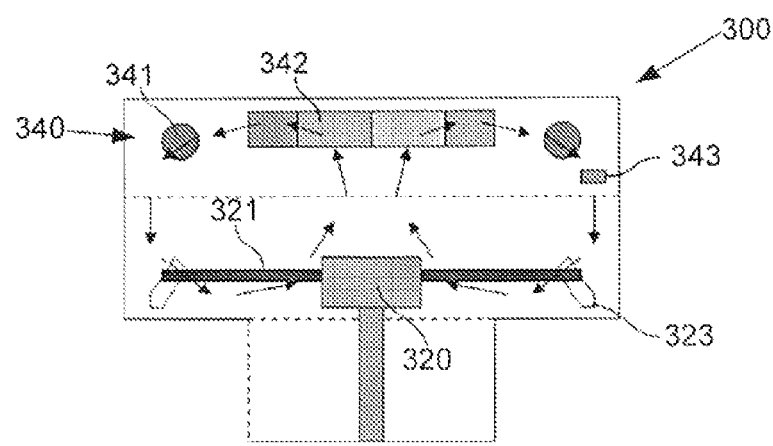
FIG. 8A is a schematic diagram of an example of the air flow in the apparatus of FIG. 3 with the chamber closed.

The closed chamber air model is used whenever vent flap 373 is closed and the fan 371 deactivated, so that there is negligible air exchange between the inside and the outside of the chamber. The effective air flow for the closed chamber model is shown schematically in FIG. 8A.

In one example, the closed chamber model is a two-part linear model having first and second models that relate the temperature sensed by the chamber temperature sensor 343 to an accepted actual average air temperature to which the outsides of the reaction containers are exposed. Mathematically the model is given by:

$$T_{SS} = \begin{cases} k_{SL}T_S + c_L, & \text{if } T_S < T_T \\ k_{SU}T_S + c_U, & \text{if } T_S \geq T_T \end{cases} \quad (3)$$

where:
$T_{SS}$ is a closed chamber model air temperature;
$T_S$ is the sensed chamber temperature;
$T_T$ is a threshold temperature;
$k_{SL}$ is a first closed chamber model coefficient;
$k_{SU}$ is a second closed chamber model coefficient;
$c_L$ is a first closed chamber model offset value; and,
$c_U$ is a second closed chamber model offset value.

Figure 8B:
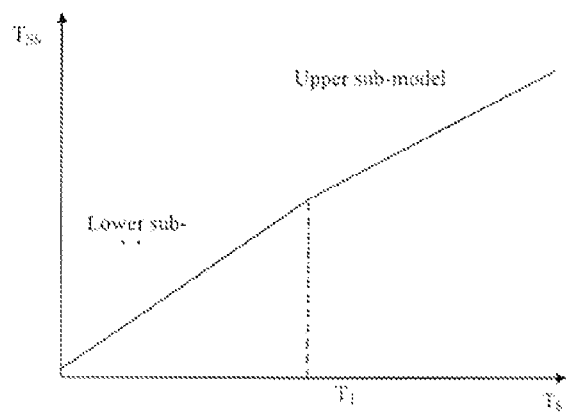
FIG. 8B is a graph of an example of first and second closed chamber models.

The resulting transfer function is shown in FIG. 8B, which highlights that the first and second models intersect at the transition temperature $T_T$. Two first order models are used in this example to compensate for any non-linearity between the sensed chamber temperature and the actual air temperature. It also allows there to be only 3 temperature points for which the model needs to be calibrated, which can be done using the 3 sets of thermal liquid crystals (TLCs) as will be described in more detail below. The calibration is performed to determine closed chamber model constants, including the threshold temperature $T_T$, the first closed chamber model coefficient $k_{SL}$, the second closed chamber model coefficient $k_{SU}$, the first closed chamber model offset value $c_L$ and the second closed chamber model offset value $c_U$. The closed chamber model constants are typically stored in the memory 411, so that these can be accessed during the temperature determination process.

Figure 8C:
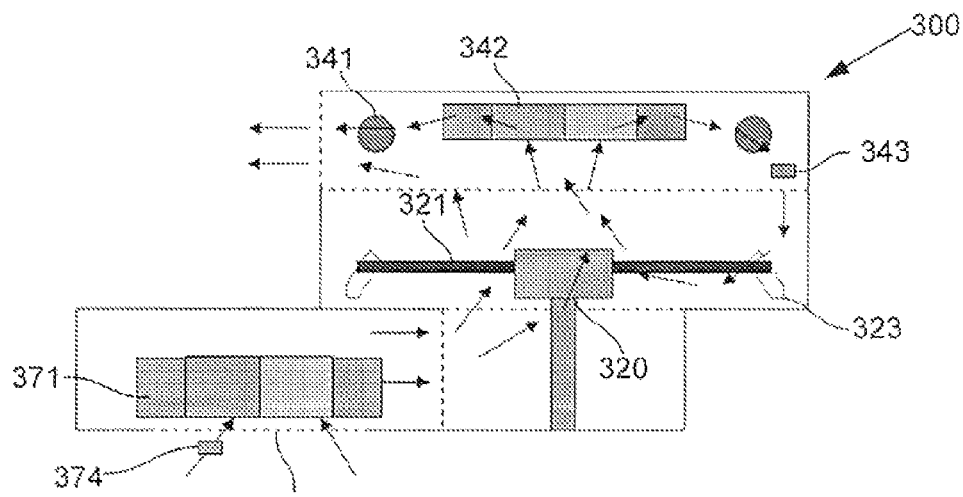
FIG. 8C is a schematic diagram of an example of the air flow in the apparatus of FIG. 3 with the chamber open.

In contrast, when the vent flap 373 is open, and the fan 371 activated air flow through the chamber is different than for the closed chamber case, and an example of the effective air flow is shown schematically in FIG. 8C. The result is that the relationship between the chamber temperature and the air temperature is different, and additionally depends upon the ambient air temperature.

Accordingly, the controller 400 uses an open chamber model to determine the open chamber model air temperature $T_{OC}$. The open chamber thermal model models this difference as a simple linear superposition of the closed-chamber air thermal model and the ambient air temperature, and in this example is given by:

$$T_{OC} = k_{SS}T_{SS} + k_{AM}T_{AM} + c_{OC} \quad (4)$$

where:
$T_{OC}$ is an open chamber model air temperature;
$T_{SS}$ is a closed chamber model air temperature;
$T_{AM}$ is a sensed ambient temperature;
$k_{SS}$ is a first open chamber model coefficient;
$k_{AM}$ is a second open chamber model coefficient;
$c_{OC}$ is an open chamber model offset value.

The open chamber model constants, including the first open chamber model coefficient $k_{SS}$, the second open chamber model coefficient $k_{AM}$ and open chamber model offset value $c_{OC}$, can be determined during a calibration process, as will be described in more detail below, and stored in the memory 411.

It will be noted that in the above example the closed chamber model air temperature is used in the open chamber model, and accordingly the closed chamber model air temperature is determined irrespective of whether the vent 373 is open or closed.

Accordingly, at step 710, the processor 410 determines if the sensed chamber temperature $T_S$ is above or below a threshold temperature $T_T$. In the event that the threshold temperature is exceeded, the processor 410 moves on to step 720 to accesses the first closed chamber model coefficient $k_{SL}$ and the first closed chamber model offset $c_L$, from the memory 411. Alternatively, if the sensed chamber temperature $T_S$ is below the threshold temperature, the processor 410 moves on to step 730 to access the second closed chamber model coefficient $k_{SU}$ and the second closed chamber model offset value $c_U$. At step 740, the processor 410 uses the accessed constants to determine the closed chamber model air temperature $T_{SS}$.

750, the controller 400 determines if the vent flap 373 is open, and if so the process advances to step 760 in which the processor 410 determines a sensed ambient temperature from the ambient temperature sensor 374. At step 770, the processor 410 accesses the open chamber model constants, including the first open chamber model coefficient $k_{SS}$, the second open chamber model coefficient $k_{AM}$ and the open chamber model offset value $c_{OC}$, before calculating the open chamber model air temperature $T_{OC}$.

Following this, or in the event that the vent flap 373 is closed, the processor 410 uses the air temperature $T_{Eff}$, which is based on either the closed chamber model air temperature $T_{SS}$ or the open chamber model air temperature $T_{OC}$, to determine a liquid temperature. In one example, this is achieved using a liquid thermal model.

The liquid thermal model has only one input, namely the air temperature $T_{Eff}$, with the liquid temperature being given by:

$$T_L = (n) = (1 - k_E - k_L)T_L(n-1) + k_L T_L(n-2) + k_E T_{Eff}(n) \quad (5)$$

where:
n is a discrete time interval;
$T_L(n)$ is the liquid temperature at time n;
$T_{Eff}(n)$ is the air temperature at time n;
$k_E$ is a first liquid model coefficient; and,
$k_L$ is a second liquid model coefficient.

Derivation of this equation is outlined below in Appendix A.

The liquid model constants including the first liquid model coefficient $k_E$ and the second liquid model coefficient $k_L$ are determined during a calibration process, as will also be described in more detail below, and stored in the memory 411. The model is implemented by the controller 400 and is essentially the entire liquid thermal model in discrete time.

The liquid model constants are dependent on the volume of sample used, and optionally the reaction container used and accordingly different liquid model constants may be stored for different liquid volumes and/or reaction container types. In this instance, the user can provide relevant details, such as a sample volume and reaction container type when selecting the particular thermal cycling process to be performed, thereby allowing the processor 410 to access relevant liquid model constants from the memory 411, at step 790. In the event that reference constants are not available for the current liquid volume, these will typically be extrapolated from available liquid model constants, using a linear interpolation or other similar technique.

Figure 5:
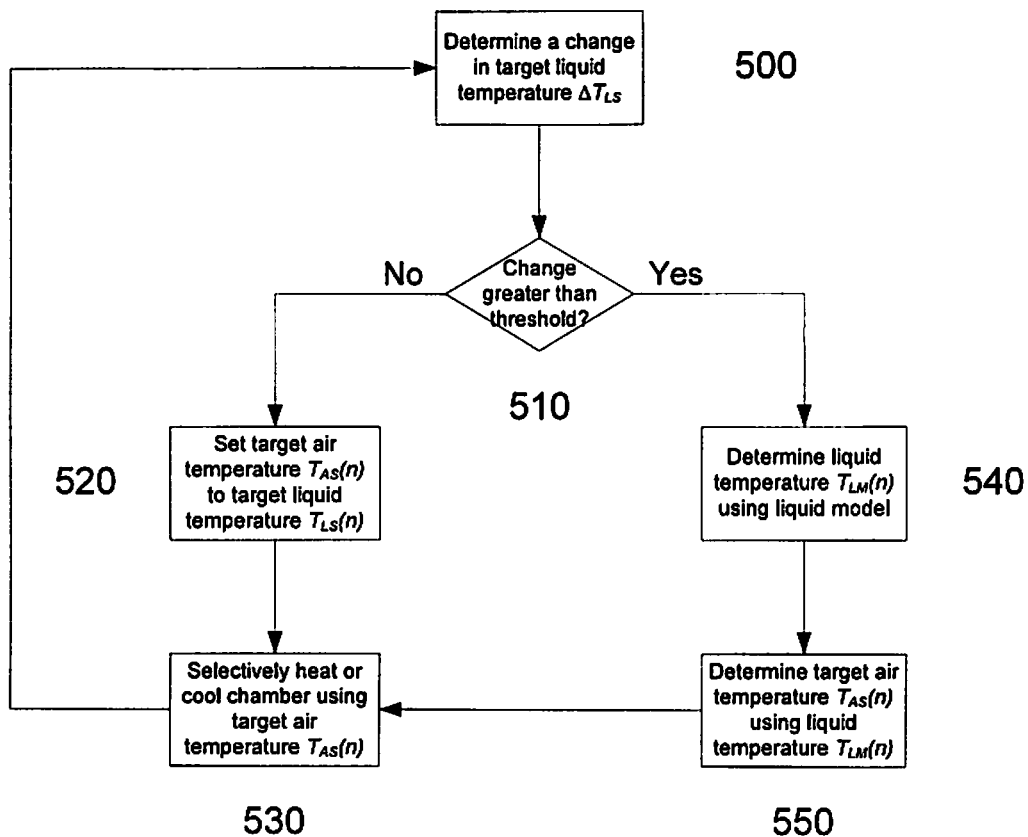
FIG. 5 is a flow chart of an example of a process for controlling the temperature of a reaction mixture using the apparatus of FIG. 3.

Once the relevant liquid model constants have been determined, the processor 410 calculates the liquid temperature at step 800, allowing the controller 400 to control the heater 340, the fan 371 and the vent flap 373 in accordance with the thermal control process of FIG. 5 above.

Figure 7:
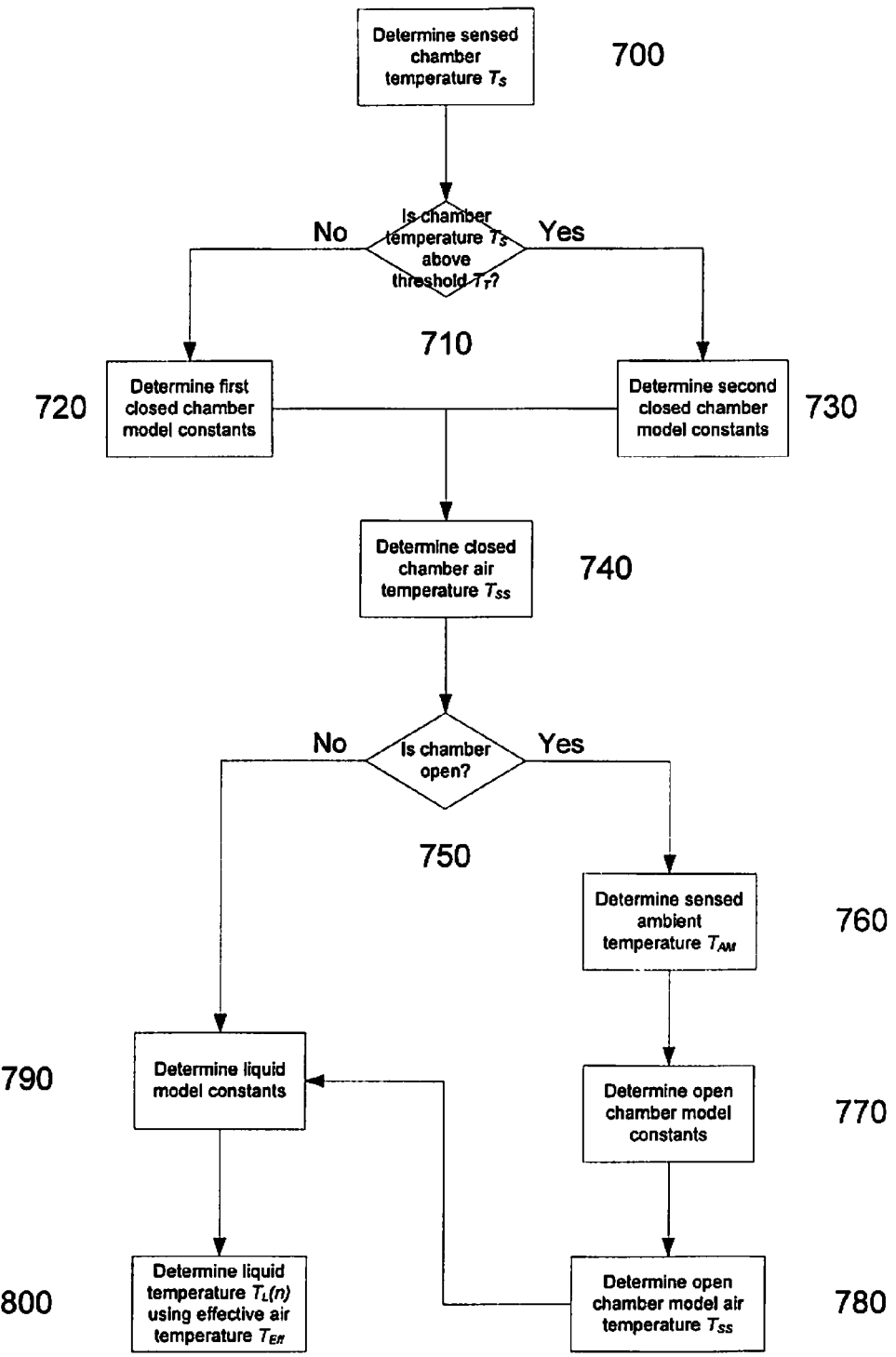
FIG. 7 is a flow chart of an example of a process for determining the temperature of a reaction mixture using the apparatus of FIG. 3.

Accordingly, it will be appreciated that the process of FIG. 7 allows the controller 400 to calculate the liquid temperature in real time, based on signals from the temperature sensors 343, 374, and using the air and liquid thermal models. This information can then be used in the control algorithm of FIG. 5, allowing rapid and accurate liquid temperature control to be achieved.

Figure 10:
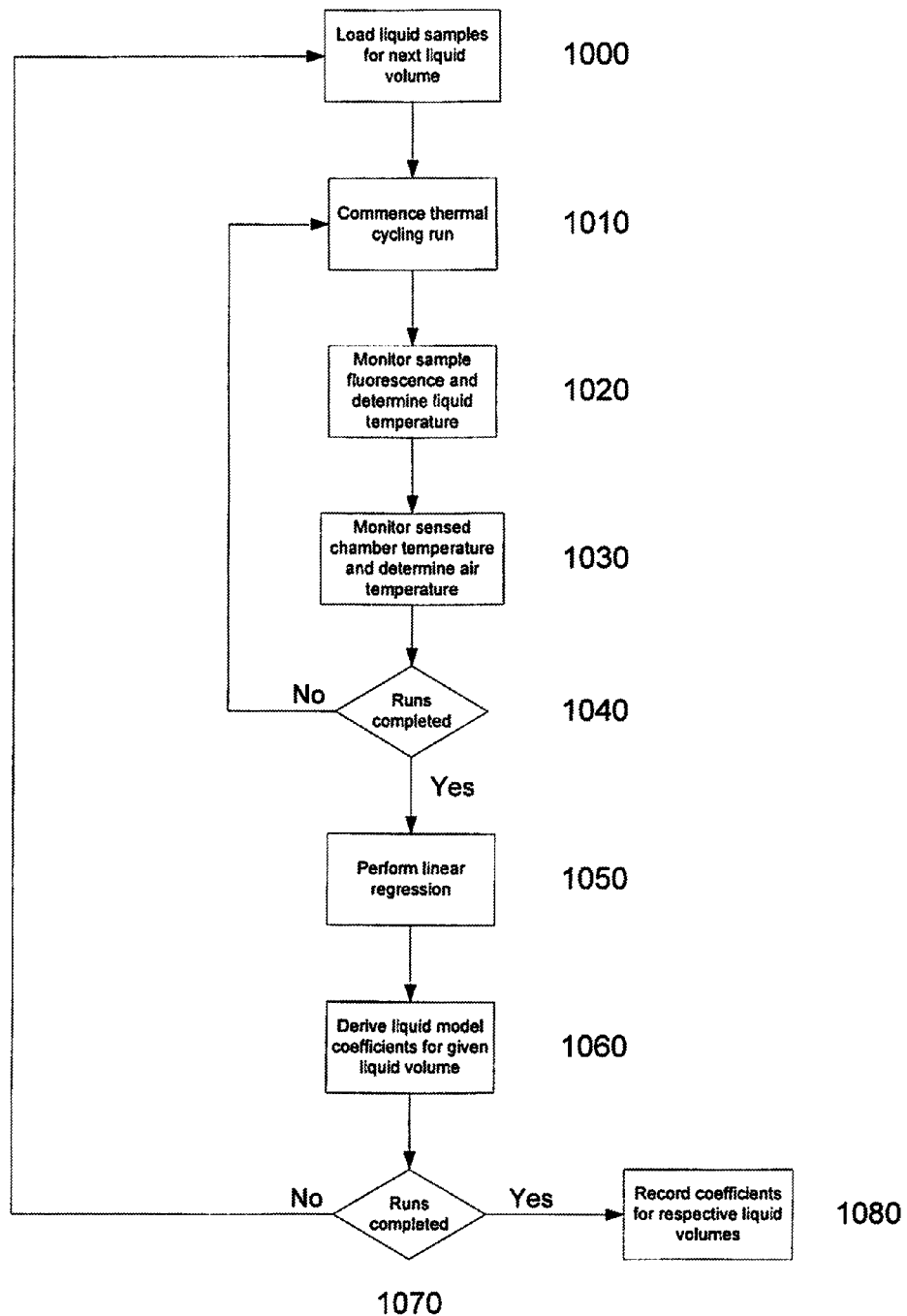
FIG. 10 is a flow chart of an example of a process for calibrating a liquid thermal model using a thermal cycling apparatus.
Figure 11:
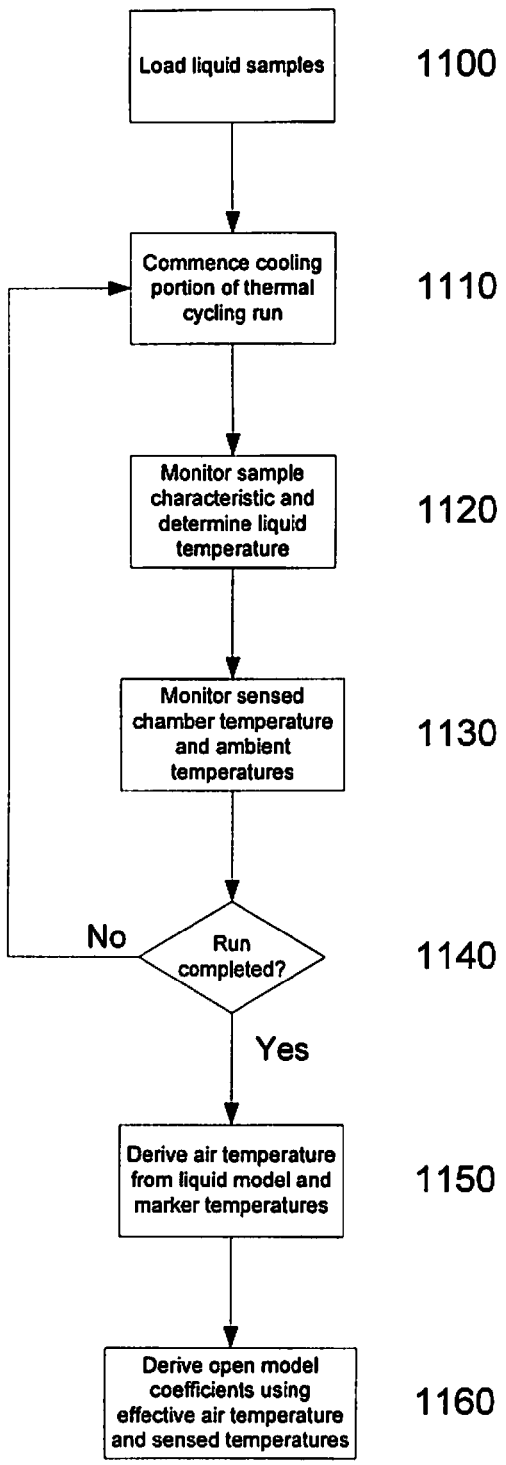
FIG. 11 is a flow chart of an example of a process for calibrating an open chamber air thermal model of a thermal cycling apparatus.

As mentioned above, reference constants used in the air and liquid models can be determined during a calibration process, an example of which will now be described with reference to FIGS. 9 to 11. In this example, the general process is to first calibrate a specific thermal cycling apparatus 300, to determine closed chamber model constants. Once this is completed, calibration is performed on the same machine to determine constants for the liquid thermal model, with these results being used to calibrate the open chamber model.

The closed and open chamber model constants relate the readings from the temperature sensors 343, 374 to the air temperature in the chamber and are therefore thermal cycling apparatus specific. These calibrations are therefore performed on a per machine basis. By contrast, the liquid model relates the air temperature to which the reaction containers are exposed to the heating of the liquid, and are therefore thermal cycling apparatus independent. However, these constants do depend on the liquid volume in the tube, and optionally the nature of the reaction container itself, and accordingly liquid model calibration is typically performed for a range of different sample volumes, and optionally reaction containers.

An example process for calibrating the closed chamber model constants for a specific thermal cycling apparatus will now be described with reference to FIG. 9.

In this example, at step 900 the thermal cycling apparatus 300 is loaded with at least three liquid samples including respective markers. Each marker is adapted to undergo a detectable change at a respective marker temperature and whilst any markers may be used, typically the markers in the form of thermal liquid crystals (TLCs), Pyronin-Y, or the like. The markers undergo an optical change, which can be detected by the optical sensor 360, at a known temperature, allowing three known liquid temperatures to be detected.

At step 910, the processor 410 controls the heater 340 to cause the chamber 311 to gradually increase in temperature, with the vent flap 373 closed. By increasing the temperature gradually, the liquid samples are assumed to be in thermal equilibrium with air in the chamber, so that the liquid temperature is effectively equal to the air temperature.

At step 920, the processor 410 monitors a signal from the optical sensor 360 to determine if a marker change has occurred. If a marker change is not detected the process returns to step 910, allowing further heating to occur. Otherwise, once a marker change has been detected, the controller 400 records the chamber temperature sensed by the chamber temperature sensor 343, together with the associated marker temperature of the marker undergoing the change, at step 930.

At step 940, the controller 400 determines if each of the markers have undergone a change, and if not the process returns to step 910, allowing further heating to occur. Otherwise, at step 950, the processor 410 derives the closed chamber model constants.

It will be appreciated from the model above in equation (3) that two of the three reference temperatures are used to define the first closed chamber model constants, with another two of the three reference temperatures being used to define the second closed chamber model constants, with each model being based on a linear relationship. The determined constants can then be stored in the memory 411 for subsequent retrieval and use.

An example process for calibrating the liquid model constants will now be described with reference to FIG. 10.

In this example, at step 1000 a thermal cycling apparatus 300 is loaded with liquid samples of a given volume, and in given reaction containers. The liquid samples have a characteristic that undergoes a detectable change with changes in temperature. In one example, the liquid samples include Pyronin-Y, which undergoes a continuous change in fluorescence with temperature, thereby allowing a liquid temperature to be determined based on the liquid fluorescence.

Figure 9:
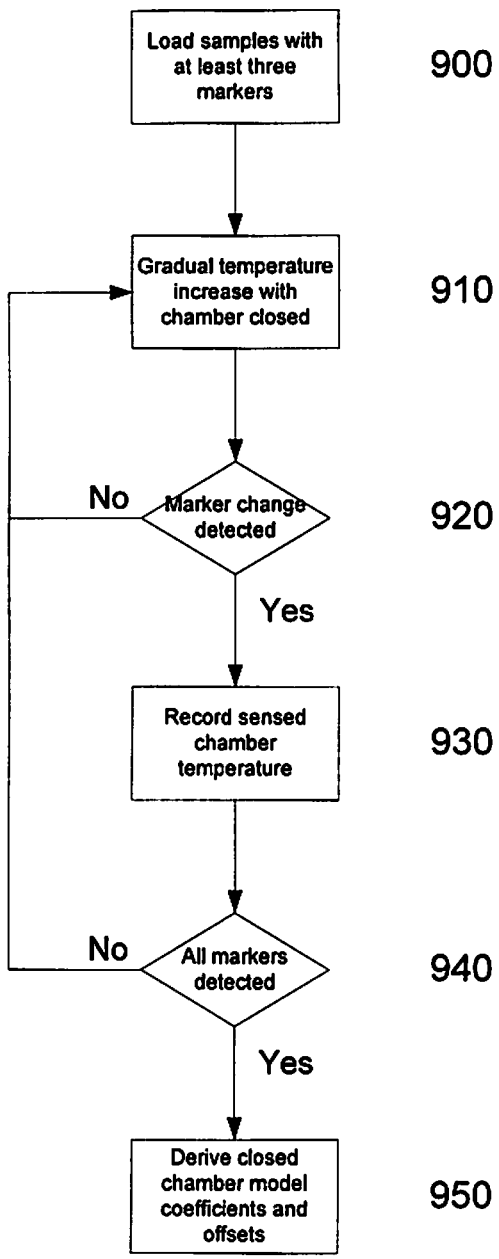
FIG. 9 is a flow chart of an example of a process for calibrating a closed chamber air thermal model of a thermal cycling apparatus.

It should be noted that in one example, TLCs similar to those used in FIG. 9 above are not used in calibrating the liquid model constants as they do not emulate the thermal properties of a PCR buffer solution (aqueous solution) as well as a pyronin-Y solution. However, it will be appreciated that any marker that does suitably emulate a PCR buffer solution could be used.

At step 1010, the processor 410 controls the heater 340, the flap 373 and the fan 371 to perform a thermal cycling process, and in particular to cause the samples to undergo a sequence of temperature changes. At step 1020, the processor 410 monitors the characteristic of the liquid sample, which in this example involves monitoring signals from the optical sensor 360 to determine the sample fluorescence, and then using this information to derive a liquid temperature. At the same time, at step 1030, the controller 400 monitors signals from the chamber temperature sensor 343, to determine a sensed chamber temperature, which is then used to derive an air temperature. The air temperature is determined from the sensed chamber temperature using the closed chamber model and the calibration information derived from the process of FIG. 9. Accordingly, this process is performed when the chamber is closed, and fluorescence and chamber temperature are not therefore monitored when the chamber is open.

At step 1040, the controller 400 determines if the thermal cycling runs are complete, and if not the process returns to step 1010, allowing the run to continue. Otherwise, at step 1050, the processor 410 performs a linear regression based on the air temperature derived from the sensed chamber temperature, and the liquid temperature derived from the fluorescence of the liquid sample. The linear regression is used to derive the liquid model constants at step 1060, and is described in detail in Appendix B.

At step 1070, the controller 400 determines if all sample volumes and all reaction container types have been tried, and if not the process returns to step 1000, allowing different sample volumes and/or reaction containers to be calibrated. Otherwise, at step 1080 the process ends with the determined liquid model constants being stored in memory 411, as well as being optionally exported for use on other thermal cycling devices.

An example process for calibrating the open chamber model constants for a specific thermal cycling apparatus will now be described with reference to FIG. 11.

In this example, at step 1100 the thermal cycling apparatus 300 is loaded with liquid samples of a given volume, and in given reaction containers. The liquid samples have a characteristic that undergoes a detectable change with changes in temperature. In one example, the liquid samples include Pyronin-Y, which undergoes a continuous change in fluorescence with temperature, thereby allowing a liquid temperature to be determined based on the liquid fluorescence.

It should be noted that in one example, TLCs similar to those used in FIG. 9 above are not used in calibrating the liquid model constants as they do not emulate the thermal properties of a PCR buffer solution (aqueous solution) as well as a pyronin-Y solution. However, it will be appreciated that any marker that does suitably emulate a PCR buffer solution could be used.

At step 1110, the processor 410 controls the heater 340 to initially heat the chamber, before opening the flap 373 and activating the fan 371 to commence a cooling portion of a thermal cycle run, thereby causing the chamber 311 to cool. At step 1120, the processor 410 monitors the characteristics of the liquid sample, which in this example, involves monitoring signals from the optical sensor 360 to determine the sample fluorescence. This is performed to determine a number of liquid temperatures at different times. Simultaneously, at step 1130, the processor 410 monitors the chamber temperature sensed by the chamber temperature sensor 343, and the ambient temperature sensed by the ambient temperature sensor 374, to thereby determine sensed chamber and ambient temperatures, measured at corresponding times.

At step 1140, the controller 400 determines if the cooling run is finished, and if not the process returns to step 1110, allowing further cooling to occur.

Otherwise, at step 1150, the processor 410 uses the liquid model to derive the air temperature for each liquid temperature detected using the sample fluorescence. Using this information, as well as the sensed chamber and ambient temperatures and the closed chamber model, the processor 410 can determine the open chamber model constants at step 1160, with the determined constants being stored in the memory 411 for subsequent retrieval and use.

Accordingly, the above calibration process allows reference constants to be easily determined for the air and liquid thermal models described above, thereby allowing the models to be easily implemented.

In any event, it will be appreciated that the above described method and apparatus allows the temperature of a sample liquid to be determined using signals from a chamber temperature sensor and optionally an ambient temperature sensor. The liquid temperature accurately reflects the temperature of liquid samples within the reaction containers, thereby allowing the determined liquid temperature to be used in controlling thermal cycling processes, for example as is used in PCR reactions. In one example, the liquid temperature can then be used in a proportional overshoot process similar to that described above with reference to FIG. 5, allowing rapid and accurate temperature adjustment of liquid samples to be achieved.

It will be appreciated that whilst the above described system typically uses an open chamber model, as well as a closed chamber model, this may not be required if the chamber remains closed during the thermal cycling process, as may occur for example if an alternative cooling mechanism is used. In this instance, if the cooling mechanism is within the chamber, this may be taken into account by monitoring temperature changes using the chamber temperature sensor only. Alternatively, other equivalent models may be used.

Although the invention has been described with reference to specific examples, it will be appreciated by those skilled in the art that the invention may be embodied in many other forms. In particular features of any one of the various described examples may be provided in any combination in any of the other described examples.

APPENDIX A

Figure 12:
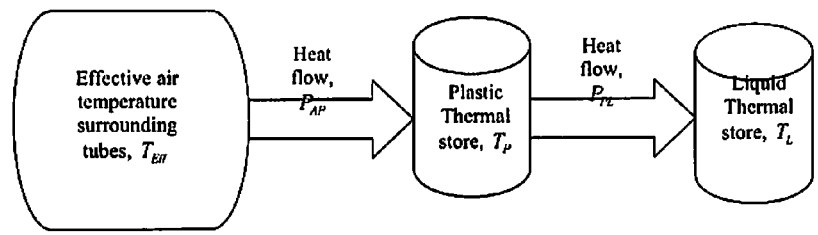
FIG. 12 is a schematic diagram of an example of a liquid thermal model heat flow diagram; and, FIG. 13 is an image of an example 200 mL reaction container containing a coloured liquid and indicating associated liquid thermal model quantities.
Figure 13:
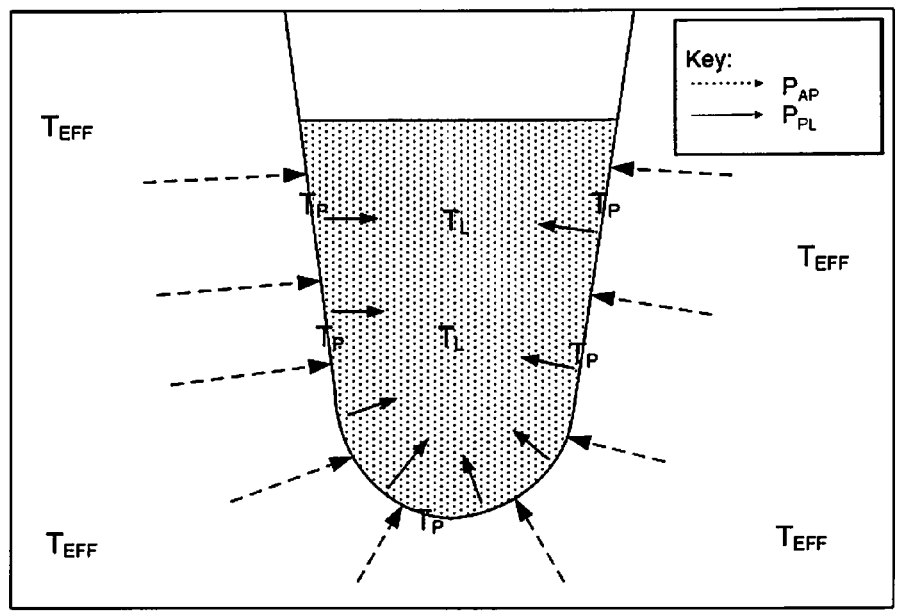

In the liquid thermal model it is assumed that there are two thermal stores—the "tube plastic" and the liquid. It is assumed that there are also two corresponding thermal resistors, one from the air to the plastic, and then one from the plastic into the liquid. It is also assumed that the liquid has a negligible effect on the plastic temperature. A liquid thermal model heat flow diagram is shown in FIG. 12, with an image of typical 200 μL reaction container containing a coloured liquid showing how the liquid thermal model quantities are assumed to relate to the real system being modelled, being shown in FIG. 13.

Liquid Thermal Model Continuous-Time Equations

The heat flow into the plastic can be represented by this equation:

$$P_{AP}=G_{AP}(T_{Eff}-T_P) \quad (6)$$

Where $P_{AP}$ is the heating power from air to plastic (usually expressed in Watts (W))

$G_{AP}$ is the thermal conductance from air to plastic (usually expressed in Watts per degree Celcius (W/° C.))

$T_{Eff}$ is the effective air temperature to which the tubes are exposed (usually expressed in degrees Celcius (° C.))

$T_P$ is the plastic temperature (usually expressed in ° C.))

Similarly the heat flow into the liquid can be represented by an equation of the same form:

$$P_{PL}=G_{PL}(T_P-T_L) \quad (7)$$

Where $P_{PL}$ is the heating power from plastic to liquid (usually expressed in Watts (W)).

$G_{PL}$, is the thermal conductance from plastic to liquid (usually expressed in Watts per degree Celcius (W/° C.)).

$T_P$ is the plastic temperature (usually expressed in ° C.)).

$T_L$ is the liquid temperature (usually expressed in ° C.)).

Continuous-Time Differential Equations

The rate of change of temperature of the plastic can be represented by the following equation:

$$\frac{dT_P}{dt} = \frac{P_{AP}}{C_P} \quad (8)$$

Where $$\frac{dT_P}{dt}$$

is the rate of change of the plastic temperature (usually express in degrees Celcius per second (° C./s)).

$C_P$ is the heat capacity of the plastic (usually expressed in Joules per degree Celcius (J/° C.)).

Similarly, the rate of change of temperature of the liquid can be represented by the following equation:

$$\frac{dT_L}{dt} = \frac{P_{PL}}{C_L} \quad (9)$$

Where $$\frac{dT_L}{dt}$$

is the rate of change of the liquid temperature (usually expressed in degrees Celcius per second (° C./s)).

$C_L$ is the heat capacity of the liquid (usually expressed in Joules per degree Celcius (J/° C.)).

The above equations of heat flow (equations (6) and (7)) and rate of change of temperature (equations (8) and (9)) can be combined to condense the unknown constants, as follows:

$$\frac{dT_P}{dt} = \omega_{AP}(T_{Eff} - T_P) \quad (10)$$

And $$\frac{dT_L}{dt} = \omega_{PL}(T_P - T_L) \quad (11)$$

Where
- $\omega_{AP}$ is a constant relating the rate of change of plastic temperature to the difference between the plastic and the effective air temperature. It is also the 3 dB cut-off angular frequency of the corresponding low-pass filter. The value of this could be expressed in Hertz (Hz).
- $\omega_{PL}$ is a constant relating the rate of change of liquid temperature to the difference between the liquid and the plastic temperature. It is also the 3 dB cut-off angular frequency of the corresponding low-pass filter. The value of this could be expressed in Hertz (Hz).

The constant $\omega_{AP}$ is also related to $G_{AP}$ and $C_P$ by:

$$\omega_{AP} = \frac{G_{AP}}{C_P} \quad (12)$$

Similarly the constant $\omega_{PL}$ is also related to $G_{PL}$ and $C_L$ by:

$$\omega_{PL} = \frac{G_{PL}}{C_L} \quad (13)$$

The constants, $\omega_{AP}$ and $\omega_{PL}$, can also be considered the inverse time-constants:

$$\tau_{AP} = \frac{1}{\omega_{AP}}$$

and $$\tau_{PL} = \frac{1}{\omega_{PL}}$$

Where
- $\tau_{AP}$ is the time-constant of the relation between the air temperature and the plastic temperature. The value of this could be expressed in seconds (s). This is equivalent to the time it takes for the plastic to change by 63% of a step-change in air temperature.
- $\tau_{PL}$ is the time-constant of the relation between the plastic temperature and the liquid temperature. The value of this could be expressed in seconds (s). This is equivalent to the time it takes for the liquid to change by 63% of a step-change in plastic temperature.

Solutions to Differential Continuous-Time Equations

The solution to equation (10), assuming constant $T_{Eff}$ is the decaying exponential function of equation (14).

$$T_P(t) = T_{Eff} + [T_P(t_0) - T_{Eff}]e^{-\omega_{AP}(t-t_0)} \quad (14)$$

Similarly, the solution to equation (11), assuming constant $T_P$ is the decaying exponential function of equation (15).

$$T_L(t) = T_P + [T_L(t_0) - T_P]e^{-\omega_{PL}(t-t_0)} \quad (15)$$

Liquid Thermal Model Discrete-Time Separated Equations

The liquid thermal model is typically implemented on a microcontroller in the thermal cycling apparatus electronics and should therefore be in a discrete-time form. The continuous time, t, is then related to the discrete time sample index, n, using the equation:

$$t = nT \quad (16)$$

Where
T is the discrete time sampling period which in one example is 100 ms $$T_P(nT) = T_{Eff} + [T_P(n-1)T) - T_{Eff}]e^{-\omega_{AP}T}$$

$$T_P(nT) = T_{Eff} + T_P(n-1)T)e^{-\omega_{AP}T} - T_{Eff}e^{-\omega_{AP}T}$$

$$T_P(nT) = e^{-\omega_{AP}T}T_P((n-1)T) + [1 - e^{-\omega_{AP}T}]T_{Eff}$$

Replacing $1 - e^{-\omega_{AP}T}$ with $h_{AP}$:

$$T_P(nT) = (1 - h_{AP})T_P((n-1)T) + h_{AP}T_{Eff}$$

Assuming that $T_{Eff}$ remains constant over the whole sample interval:

$$T_P(nT) = (1 - h_{AP})T_P((n-1)T) + h_{AP}T_{Eff}(nT)$$

Replacing time-dependence with sample index dependence:

$$T_P(n) = (1 - h_{AP})T_P(n-1) + h_{AP}T_{Eff}(n) \quad (17)$$

And repeating the process on equation (11) produces:

$$T_L(n) = (1 - h_{PL})T_L(n-1) + h_{PL}T_P(n) \quad (18)$$

Where
- $h_{AP}$ is the discrete-time 3 dB cut-off angular frequency of the model relating plastic temperature to air temperature.
- $h_{PL}$ is the discrete-time 3 dB cut-off angular frequency of the model relating liquid temperature to plastic temperature.

Liquid Thermal Model Combined Equation

It is not practical to directly measure the plastic temperature (even if the real system was the same as the model described here), however it is possible and practical to measure the liquid temperature. Additionally, the liquid temperature is the temperature which we are interested in, not the plastic temperature. The above two first-order equations can be combined to give a second-order equation which removes the plastic temperature discrete-time signal.

$$T_L(n) = (1 - h_{PL})T_L(n-1) + h_{PL}((1 - h_{AP})T_P(n-1) + h_{AP}T_{Eff}(n))$$

$$T_L(n) = (1 - h_{PL})T_L(n-1) + h_{PL}\left[(1 - h_{AP})\left(\frac{T_L(n-1) - (1 - h_{PL})T_L(n-2)}{h_{PL}}\right) + h_{AP}T_{Eff}(n)\right]$$

$$T_L(n) = (1 - h_{PL})T_L(n-1) + (1 - h_{AP})(T_L(n-1) - (1 - h_{PL})T_L(n-2)) + h_{PL}h_{AP}T_{Eff}(n)$$

$$T_L(n) = (1 - h_{PL})T_L(n-1) + (1 - h_{AP})(T_L(n-1) - T_L(n-2) + h_{PL}T_L(n-2)) + h_{PL}h_{AP}T_{Eff}(n)$$

$$T_L(n) = (1 - h_{PL})T_L(n-1) + T_L(n-1) - T_L(n-2) + h_{PL}T_L(n-2) - h_{AP}T_L(n-1) + h_{AP}T_L(n-2) - h_{AP}h_{PL}T_L(n-2)) + k_{PL}k_{AP}T_{Eff}(n))$$

$$T_L(n) = (2 - h_{PL} - h_{AP})T_L(n-1) + (-1 + h_{AP} + h_{PL} - h_{AP}h_{PL})T_L(n-2) + h_{PL}h_{AP}T_{Eff}(n)$$

This can be simplified further by condensing constants again:

$$k_L = -1 + h_{AP} + h_{PL} - h_{AP}h_{PL} \quad (19)$$

$$k_E = h_{PL}h_{AP} \quad (20)$$

So it follows:

$$k_L = -1 + h_{AP} + h_{PL} - k_E$$

$$-h_{AP} - h_{PL} = -1 - k_E - k_L$$

$$2 - h_{AP} - h_{PL} = 1 - k_E - k_L$$

So the simplified discrete-time second-order differential equation describing the liquid thermal model, which relates the liquid temperature over time to the effective air temperature over time is:

$$T_L(n) = (1 - k_E - k_L) T_L(n-1) + k_L T_L(n-2) + k_E T_{Eff}(n) \quad (21)$$

Having the equation in the above form (i.e. with no plastic temperature term) allows the constants to be easily computed from a set of liquid and air temperature discrete-time signal data, such as by using multivariate linear regression (as described in Appendix B).

Working Backwards to Extract Discrete-Time Separated Equation Constants

The constants of equations (17) and (18) above, $h_{AP}$ and $h_{PL}$, can be derived from the constants of equation (21), $k_E$ and $k_L$. Combining equations (19) and (20):

$$k_L = -1 + h_{AP} + h_{PL} - h_{AP} h_{PL}$$

$$k_L = -1 + h_{AP} + \frac{k_E}{h_{AP}} - k_E$$

$$h_{AP} = k_L + 1 - \frac{k_E}{h_{AP}} + k_E$$

Multiplying by $h_{AP}$:

$$h_{AP}^2 = h_{AP} k_L + h_{AP} - k_E + k_E h_{AP}$$

$$h_{AP}^2 - h_{AP} k_L - h_{AP} - k_E h_{AP} + k_E = 0$$

$$h_{AP}^2 + (-k_L - k_E - 1) h_{AP} + k_E = 0$$

Completing the square using temporary variables a, b and c:

$$a = 1$$
$$b = -k_L - k_E - 1$$
$$c = k_E$$
$$h_{AP} = \frac{-b + \sqrt{b^2 - 4ac}}{2a}$$
$$h_{PL} = \frac{k_E}{h_{AP}}$$

Applying these equations to the typical fitted constants allows values of $h_{AP}$ and $h_{PL}$ to be determined Working Backwards to Extract Continuous-Time Equation Constants As discussed above, the relation exists:

$$h_{AP} = 1 - e^{-\omega_{AP} T}$$
$$e^{-\omega_{AP} T} = 1 - h_{AP}$$
$$\ln(1 - h_{AP}) = -\omega_{AP} T$$
$$\omega_{AP} = \frac{-\ln(1 - h_{AP})}{T}$$

and $$h_{PL} = 1 - e^{-\omega_{PL} T}$$
$$\omega_{PL} = \frac{-\ln(1 - h_{PL})}{T}$$

Applying these equations to the typical fitted constants allows values of $\omega_{AP}$ and $\omega_{PL}$ to be found.

The time constants can also be easily found:

$$\tau_{AP} = \frac{-T}{\ln(1 - h_{AP})}$$

and $$\tau_{PL} = \frac{-T}{\ln(1 - h_{PL})}$$

Applying these equations to typical fitted constants allows $\tau_{AP}$ and $\tau_{PL}$ to be found. Working backwards it is possible to extract other quantities Plastic to Liquid Thermal Conductance The value of the liquid heat capacity may be estimated in a typical aqueous solution sample, using the value of the volume of the sample and the accepted water specific heat capacity constant:

$$C_L = C_A V_L \quad (22)$$

Where $C_L$ is the liquid heat capacity.

$C_W$ is the specific heat capacity of water. It has an accepted value at 25° C. of 4.186 J/cm3/° C. (or more conveniently 4.186 mJ/μL/° C.) for μL volumes.

$V_L$ is the liquid volume of the sample.

If the value of the constant, $\omega_{PL}$ is known, along with this liquid heat capacity, then the liquid heating thermal conductance, $G_{PL}$, can be derived using equation (13):

$$G_{PL} = \omega_{PL} C_L \quad (23)$$

Liquid Heating/Cooling Power

Presented here are two methods of determining the heating power heating a liquid sample at a given time.

If the liquid heat capacity is predetermined (as above in equation (22)) and the rate of change of liquid temperature is known at a given instant, then the liquid heating power entering the tube at that instant can be calculated using a re-arrangement of equation (9):

$$P_{PL} = C_L \frac{dT_L}{dt} \quad (24)$$

If the plastic to liquid thermal conductance and the difference between the plastic temperature and the liquid temperature is known at a given instant, then the liquid heating power entering the tube at that instant can be calculated using equation (7), discussed above.

APPENDIX B

An example process for fitting Constants for the Thermal Models using Multivariate Linear Regression will now be described.

For this purpose it is convenient to approximate the behaviour of a general real system with a simple linear model which takes the form:

$$y = f(x) = \sum_{m=1}^{M} k_m x_m \quad (25)$$

Where
y is the dependent variable which the model is computing.
x is the vector of independent variables which the model depends upon.
M is the size of the vector x
$k_m$ is the proportionality constant for the independent variable $x_m$
$x_m$ is an independent variable in the vector of independent variables x.

Usually the most appropriate values of the proportionality constants k (i.e. $k_1, \ldots, k_M$) are not clear, but they can be fit using several samples of real data (x and y) from the real system and a linear regression technique (see appendix B).

The Liquid Thermal Model

The second-order liquid thermal model is of the form (equation (21)):

$$T_L(n) = (1 - k_E - k_L)T_L(n-1) + k_L T_L(n-2) + k_E T_{Eff}(n)$$

In order to make it fit into the general equation form of equation (25), it needs to be re-arranged:

$$T_L(n) = T_L(n-1) - k_E T_L(n-1) - k_L T_L(n-1) + k_L T_L(n-2) + k_E T_{Eff}(n)$$

$$T_L(n) - T_L(n-1) = k_E(T_{Eff}(n) - T_L(n-1)) + k_L(T_L(n-2) - T_L(n-1))$$

So now, in terms of equation (25):

$M=2$ $y = T_L(n) - T_L(n-1)$ $x_1 = T_{Eff}(n) - T_L(n-1)$ $x_2 = T_L(n-2) - T_L(n-1)$ $k_1 = k_E$ $k_2 = k_L$

If only closed-chamber data is used from a run, then the liquid model constants $k_L$ and $k_E$ can be calculated using the above method, without having to determine the open-chamber air thermal model constants.

Open-Chamber Air Thermal Model

Re-arranging equation (22):

$$T_L(n) = (1 - k_E - k_L)T_L(n-1) + k_L T_L(n-2) + k_E T_{Eff}(n)$$

$$k_E T_{Eff}(n) = T_L(n) - (1 - k_E - k_L)T_L(n-1) - k_L T_L(n-2)$$

$$T_{Eff}(n) = \frac{T_L(n) - (1 - k_E - k_L)T_L(n-1) - k_L T_L(n-2)}{k_E}$$

Using the above equation, the effective air temperature can be calculated from liquid temperature data, if the liquid thermal model constants are known. Once the effective air temperature is known, the open-chamber data (only) can be used to find the open-chamber air thermal model constants. So from equation (4), in the form of equation (25):

$M=3$ $y = T_{Eff}(n)$ $x_1 = T_{SS}(n)$ $x_2 = T_{AM}(n)$ $x_3 = 1$ $k_1 = k_{SS}$ $k_2 = k_{AM}$ $k_3 = c_{OC}$

Linear Least Squares Solution for Multivariate Linear Regression

The constants k of the linear model of equation (25) can be fit using multivariate linear regression when several samples, N, of y and x from the real system are available.

The linear least squares method of finding the constants k is given by:

$$k = (X^T X)^{-1} X^T y \qquad (26)$$

Where
k is a column vector of proportionality constants of size M
X is the matrix of samples with N rows and M columns, of the vector of independent variables, x, where each sample of x occupies a row.
$X^T$ is the transpose matrix of X
$X^{-1}$ is the inverse matrix of X
y is a column vector of size N containing the corresponding samples of the dependent variable, y, from the real system.

The claims defining the invention are as follows:

1. A method of controlling temperature of a liquid held within a reaction container, said method comprising:
   a) providing a thermal cycling apparatus comprising a chamber containing the reaction container, a heater, and a temperature sensor;
   b) determining a sensed chamber temperature $T_S$ from the temperature sensor in the chamber;
   c) calculating an effective air temperature $T_{Eff}$ in the chamber using the sensed chamber temperature $T_S$ and an air thermal model;
   d) calculating the temperature of the liquid $T_L$ using the effective air temperature $T_{Eff}$ in the chamber and a liquid thermal model; and,
   e) selectively heating or cooling air in the chamber using the heater, in accordance with the temperature of the liquid $T_L$,
   f) determining if the chamber is closed; and,
   g) at least one of:
      i) if the chamber is closed, calculating the effective air temperature $T_{Eff}$ in the chamber using the sensed chamber temperature $T_S$ and a closed chamber model; and,
      ii) if the chamber is open, calculating the effective air temperature $T_{Eff}$ in the chamber using the sensed chamber temperature $T_S$, a sensed ambient temperature $T_{AM}$ and an open chamber model.

2. The method according to claim 1, wherein said method includes:
   h) determining a sensed ambient temperature $T_{AM}$ from a temperature sensor outside the chamber; and,
   i) calculating the effective air temperature $T_{Eff}$ in the chamber at least in part using the sensed ambient temperature $T_{AM}$, the sensed chamber temperature $T_S$ and an air thermal model.

3. The method according to claim 1, wherein said method includes, for the closed chamber model:
   h) comparing the sensed chamber temperature $T_S$ to a threshold temperature $T_T$; and,
   i) at least one of:
      i) if the sensed chamber temperature $T_S$ is below the threshold temperature $T_T$, calculating the effective air temperature $T_{Eff}$ in the chamber using a first closed chamber model; and, ii) if the sensed chamber temperature $T_S$ is above the threshold temperature $T_T$, calculating the effective air temperature $T_{Eff}$ using a second closed chamber model.

4. The method according to claim 3, wherein the effective air temperature $T_{Eff}$ in the chamber is determined at least in part using the relationship:

$$T_{SS} = \begin{cases} k_{SL}T_S + c_L, & \text{if } T_S < T_T \\ k_{SU}T_S + c_U, & \text{if } T_S \leq T_T \end{cases}$$

where:
$T_{SS}$ is a closed chamber model air temperature;
$T_S$ is the sensed chamber temperature;
$T_T$ is a threshold temperature;
$k_{SL}$ is a first closed chamber model coefficient;
$k_{SU}$ is a second closed chamber model coefficient;
$c_L$ is a first closed chamber model offset value;
$c_U$ is a second closed chamber model offset value.

5. The method according to claim 1, wherein for the open chamber model, said method includes, calculating the effective air temperature $T_{Eff}$ in the chamber at least in part using the relationship:

$$T_{OC} = k_{SS}T_{SS} + k_{AM}T_{AM} + c_{OC}$$

where:
$T_{OC}$ is an open chamber model air temperature;
$T_{SS}$ is a closed chamber model air temperature;
$T_{AM}$ is a sensed ambient temperature;
$k_{SS}$ is a first open chamber model coefficient;
$k_{AM}$ is a second open chamber model coefficient;
$c_{OC}$ is an open chamber model offset value.

6. The method according to claim 1, wherein said method includes calculating said effective air temperature $T_{Eff}$ at least in part using the relationship:

$$T_{Eff} = \begin{cases} T_{SS}, & \text{if the chamber is closed} \\ T_{OC}, & \text{if the chamber is open} \end{cases}$$

where:
$T_{Eff}$ is the effective air temperature.

7. The method according to claim 1, wherein said method includes determining said temperature of the liquid $T_L$ at least in part using the relationship:

$$T_L(n) = (1-k_E-k_L)T_L(n-1) + k_LT_L(n-2) + k_ET_{Eff}(n)$$

where:
n is a discrete time interval;
$T_L(n)$ is the temperature of the liquid at time n;
$T_{Eff}(n)$ is the effective air temperature in the chamber at time n;
$k_E$ is a first liquid model coefficient;
$k_L$ is a second liquid model coefficient.

8. The method according to claim 1, wherein step 3) comprises, before heating or cooling air in the chamber using the heater:
i) determining a target temperature of the liquid $T_{LS}$;
ii) determining a target air temperature $T_{AS}$ in the chamber in accordance with the target temperature of the liquid $T_{LS}$; and, iii) selectively heating or cooling air in the chamber using the heater, in accordance with the target air temperature $T_{AS}$ in the chamber.

9. The method according to claim 8, wherein said method includes:
h) determining a change in target temperature of the liquid $\Delta T_{LS}$;
i) comparing the change $\Delta T_{LS}$ to a threshold $\Delta T_{OSTH}$;
j) at least one of:
  i) if the change $\Delta T_{LS}$ is less than the threshold $\Delta T_{OSTH}$, determining the target air temperature $T_{AS}$ in the chamber to be the target temperature of the liquid $T_{LS}$; and,
  ii) if the change $\Delta T_{LS}$ is more than the threshold $\Delta T_{OSTH}$, calculating the target air temperature $T_{AS}$ in the chamber in accordance with the target temperature of the liquid $T_{LS}$ and a temperature of the liquid $T_{LM}$; and
k) if the change $\Delta T_{LS}$ is more than the threshold $\Delta T_{OSTH}$, calculating the air target temperature $T_{AS}$ using the relationship:

$$T_{AS}(n) = T_{LS} + k_{OF}(T_{LS} - T_{LM}(n))$$

where:
$T_{AS}(n)$ is the air target temperature at any given discrete time n;
$T_{LS}$ is the target liquid temperature;
$k_{OF}$ is an overshoot factor constant;
$T_{LM}(n)$ is a liquid temperature at any given discrete time n.

10. The method according to claim 1 further comprising a calibration procedure using one reference constant obtained from a data store, wherein the calibration procedure comprises determining at least one closed chamber model constant by:
i) gradually increasing a chamber temperature with the chamber closed;
ii) detecting a change in each of at least three markers provided in the chamber, each of the at least three markers being adapted to undergo a detectable change at a respective marker temperature;
iii) determining a sensed chamber temperature Ts for each marker change; and
iv) determining the at least one closed chamber model constant using the sensed chamber temperature Ts and a corresponding marker temperature.

11. The method according to claim 1, further comprising a calibration procedure using one reference constant obtained from a data store, wherein the calibration procedure comprises determining at least one liquid model constant for a given liquid volume by:
performing a number of thermal cycling runs;
for each run:
  i) monitoring a characteristic of a liquid sample provided in the chamber when the chamber is closed, the sample characteristic being indicative of a liquid temperature $T_L$ of the liquid sample, wherein the characteristic is fluorescence;
  ii) determining at least one liquid temperature $T_L$ using the characteristic;
  iii) determining at least one sensed chamber temperature $T_S$ corresponding to the at least one liquid temperature $T_L$;
  iv) determining an effective air temperature $T_{Eff}$ in the chamber using the at least one sensed chamber temperature and a closed thermal model; and performing a regression analysis to relate the effective air temperature $T_{Eff}$ to the liquid temperature $T_L$ to thereby determine the at least one liquid model constant.

12. The method according to claim 11, wherein the calibration procedure comprises:
   determining at least one liquid model constant for a number of given liquid volumes; and
   interpolating at least one liquid model constant for intermediate liquid.

13. The method according to claim 1, further comprising a calibration procedure using one reference constant obtained from a data store, wherein the calibration procedure comprises determining at least one open chamber model constant by:
   changing a chamber temperature with the chamber open;
   monitoring a characteristic of a liquid sample provided in the chamber, the sample characteristic being indicative of a liquid temperature $T_L$ of the liquid sample;
   determining a number of liquid temperatures $T_L$ using the characteristic;
   determining a number of sensed chamber temperatures Ts and sensed ambient temperatures $T_{AM}$ corresponding to the number of liquid temperatures $T_L$;
   determining a number of effective air temperatures $T_{Eff}$ using the number of sensed chamber temperatures Ts and a closed thermal model; and
   determining a number of effective air temperatures $T_{Eff}$ using the number of liquid temperatures $T_L$ and a liquid thermal model; and
   determining at least one open chamber model constant using the effective air temperatures $T_{Eff}$ and the sensed chamber temperature Ts and sensed ambient temperature $T_{AM}$.

14. The method according to claim 1, wherein said method is performed at least in part using a controller of a thermal cycling apparatus, said controller including a processor and a memory.

15. The method according to claim 14, wherein said processor is for:
   receiving a sensed chamber temperature Ts from a temperature sensor in the chamber;
   determining an air temperature $T_{Eff}$ using the sensed chamber temperature Ts and an air thermal model stored in memory;
   determining a liquid temperature $T_L$ using the air temperature $T_{Eff}$ and a liquid thermal model stored in memory; and
   controlling at least one of a heater, a fan and a vent flap to thereby selectively heat and/or cool air in the chamber in accordance with the liquid temperature $T_L$.

16. An apparatus for controlling temperature of a liquid held within a reaction container, said apparatus comprising:
   a) a thermal cycling apparatus comprising a chamber containing the reaction container, a heater, and a temperature sensor; and
   b) a controller for:
      i) determining a sensed chamber temperature Ts from the temperature sensor in the chamber;
      ii) calculating an effective air temperature $T_{Eff}$ in the chamber using the sensed chamber temperature Ts and an air thermal model;
      iii) calculating the temperature of the liquid $T_L$ using the effective air temperature $T_{Eff}$ in the chamber and a liquid thermal model; and,
      iv) selectively heating and/or cooling air in the chamber using the heater, in accordance with the temperature of the liquid $T_L$;

wherein the controller is comprising a processor and a memory;
wherein said memory is for storing:
   a liquid thermal model;
   an air thermal model; and at least one of
   a closed chamber thermal model;
   an open chamber thermal model; and/or,
   at least one model constant.

17. The apparatus according to claim 16, wherein said processor is for:
   a) receiving the sensed chamber temperature $T_S$ from the temperature sensor in the chamber;
   b) calculating the effective air temperature $T_{Eff}$ in the chamber using the sensed chamber temperature $T_S$ and an air thermal model stored in the memory;
   c) calculating the temperature of the liquid $T_L$ using the air temperature $T_{Eff}$ and the liquid thermal model stored in the memory; and,
   d) controlling at least one of a heater, a fan and a vent flap to thereby selectively heat and/or cool air in the chamber in accordance with the temperature of the liquid $T_L$.

18. The apparatus according to claim 17, wherein said controller is coupled to at least one of:
   a) a chamber temperature sensor for sensing a chamber temperature $T_S$;
   b) an ambient temperature sensor for sensing an ambient temperature $T_{AM}$;
   c) a heater for heating the chamber;
   d) a fan for cycling ambient air through the chamber; and,
   e) a vent flap for closing the chamber.

19. A method of determining temperature of a liquid $T_L$ held within a reaction container in a chamber of a thermal cycling apparatus, said method including:
   a) providing a thermal cycling apparatus comprising a chamber containing the reaction container, a heater, and a temperature sensor;
   b) determining a sensed chamber temperature $T_S$ from the temperature sensor in the chamber;
   c) calculating an effective air temperature $T_{Eff}$ in the chamber using the sensed chamber temperature $T_S$ and an air thermal model;
   d) calculating the temperature of the liquid $T_L$ using the effective air temperature $T_{Eff}$ in the chamber and a liquid thermal model, and
   e) at least one of:
      i) if the chamber is closed, the effective air temperature $T_{Eff}$ is calculated in step b) using the sensed chamber temperature $T_S$ and a closed chamber model; and,
      ii) if the chamber is open, the air temperature $T_{Eff}$ is calculated in step b) using the sensed chamber temperature $T_S$, a sensed ambient temperature $T_{AM}$ and an open chamber model.

20. An apparatus for determining the temperature of a liquid $T_L$ held within a reaction container, said apparatus comprising:
   a) a thermal cycling apparatus comprising a chamber containing the reaction container, a heater, and a temperature sensor; and
   b) a processor for:
      i) determining a sensed chamber temperature $T_S$ from the temperature sensor in the chamber;
      ii) calculating an effective air temperature $T_{Eff}$ in the chamber using the sensed chamber temperature $T_S$ and an air thermal model; and,
      iii) calculating the temperature of the liquid $T_L$ using the effective air temperature $T_{Eff}$ in the chamber and a liquid thermal model;

c) a memory for storing:
  i) a liquid thermal model;
  ii) an air thermal model; and at least one of
  iii) a closed chamber thermal model;
  iv) an open chamber thermal model; and/or,
  v) at least one model constant.

\* \* \* \* \*